US007882491B2

(12) United States Patent  
Kodosky et al.

(10) Patent No.: US 7,882,491 B2  
(45) Date of Patent: *Feb. 1, 2011

(54) AUTOMATIC GENERATION OF A GRAPHICAL PROGRAM WITH A STRUCTURE NODE IN RESPONSE TO RECEIVING A DIAGRAM WITH STATES AND STATE TRANSITIONS

(75) Inventors: Jeffrey L. Kodosky, Austin, TX (US); Kevin Hogan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 942 days.

This patent is subject to a terminal disclaimer.

(21) Appl. No.: 11/744,497

(22) Filed: May 4, 2007

(65) Prior Publication Data

US 2007/0261024 A1    Nov. 8, 2007

Related U.S. Application Data

(63) Continuation of application No. 11/683,568, filed on Mar. 8, 2007, which is a continuation of application No. 09/747,091, filed on Dec. 21, 2000, now Pat. No. 7,200,838, which is a continuation-in-part of application No. 09/745,023, filed on Dec. 20, 2000, now Pat. No. 7,210,117.

(51) Int. Cl.  
*G06F 9/44* (2006.01)  
*G06F 3/00* (2006.01)  
*G06F 3/048* (2006.01)

(52) U.S. Cl. .................. 717/109; 717/105; 717/106; 717/104; 715/762; 715/763

(58) Field of Classification Search .................. None  
See application file for complete search history.

(56) References Cited

U.S. PATENT DOCUMENTS 4,831,580 A    5/1989    Yamada (Continued)

FOREIGN PATENT DOCUMENTS

EP    1077404 A2    2/2001

(Continued)

OTHER PUBLICATIONS

Eva Magnusson; "State diagram Generation" term paper in the graduate course Attribute Grammars; Spring 1999; 21 pages; Lund University.

(Continued)

*Primary Examiner*—Insun Kang  
(74) *Attorney, Agent, or Firm*—Meyertons Hood Kivlin Kowert & Goetzel, P.C.; Jeffrey C. Hood; Joel L. Stevens

(57) ABSTRACT

A system and method for automatically generating a data flow diagram in response to a first diagram. The first diagram may specify one or more states and one or more state transitions, wherein each state transition specifies a transition from a first state to a second state. A data flow diagram may be automatically generated from the first diagram. A hardware description may be generated from the data flow diagram. The hardware description may be usable to configure a programmable hardware element such as, for example, a field-programmable gate array (FPGA). The configured programmable hardware element may implement a hardware implementation of the data flow diagram.

20 Claims, 15 Drawing Sheets

U.S. PATENT DOCUMENTS

| | | | |
|---|---|---|---|
| 5,504,917 | A | 4/1996 | Austin |
| 5,603,018 | A | 2/1997 | Terada et al. |
| 5,697,788 | A | 12/1997 | Ohta |
| 5,732,277 | A | 3/1998 | Kodosky et al. |
| 5,754,426 | A | 5/1998 | Dumais |
| 5,862,372 | A | 1/1999 | Morris et al. |
| 5,870,590 | A | 2/1999 | Kita et al. |
| 5,920,718 | A | 7/1999 | Uczekaj et al. |
| 5,966,532 | A | 10/1999 | McDonald et al. |
| 6,018,627 | A | 1/2000 | Iyengar et al. |
| 6,023,578 | A | 2/2000 | Birsan et al. |
| 6,118,448 | A | 9/2000 | McMillan et al. |
| 6,138,171 | A | 10/2000 | Walker |
| 6,212,672 | B1 | 4/2001 | Keller et al. |
| 6,219,628 | B1 | 4/2001 | Kodosky et al. |
| 6,366,300 | B1 | 4/2002 | Ohara et al. |
| 6,405,361 | B1 | 6/2002 | Broy et al. |
| 6,437,805 | B1 | 8/2002 | Sojoodi et al. |
| 6,453,464 | B1 | 9/2002 | Sullivan |
| 6,499,136 | B1 | 12/2002 | Dempsey et al. |
| 6,816,914 | B1 | 11/2004 | Heinzman et al. |
| 2001/0020291 | A1 | 9/2001 | Kudukoli et al. |
| 2001/0024211 | A1 | 9/2001 | Kudukoli et al. |
| 2001/0034879 | A1 | 10/2001 | Washington et al. |
| 2001/0035879 | A1 | 11/2001 | Washington et al. |
| 2001/0037496 | A1 | 11/2001 | Simonyi |
| 2002/0063734 | A1* | 5/2002 | Khalfay et al. ............. 345/744 |
| 2002/0070968 | A1 | 6/2002 | Austin et al. |
| 2002/0083413 | A1 | 6/2002 | Kodosky et al. |
| 2002/0089538 | A1 | 7/2002 | Wenzel et al. |
| 2002/0129333 | A1 | 9/2002 | Chandhoke et al. |
| 2003/0046061 | A1 | 3/2003 | Preston et al. |
| 2003/0167455 | A1 | 9/2003 | Iborra et al. |
| 2003/0200076 | A1 | 10/2003 | Kodosky et al. |
| 2004/0034696 | A1 | 2/2004 | Joffrain et al. |
| 2004/0034847 | A1 | 2/2004 | Joffrain et al. |
| 2004/0221238 | A1* | 11/2004 | Cifra et al. ............. 715/762 |
| 2005/0028138 | A1 | 2/2005 | Case et al. |
| 2005/0091602 | A1 | 4/2005 | Ramamoorthy et al. |
| 2006/0005170 | A1* | 1/2006 | Rosaria et al. ............. 717/126 |

OTHER PUBLICATIONS

Simona Vasilache and Jiro Tanaka; "Translating OMT State Diagrams with Concurrency into SDL Diagrams"; Aug. 28-31, 2000; 6 pages plus cover page; University of Tsukuba, Japan.

"User's Guide, Stateflow"; The MathWorks; 1997-2001, 6 pages.

"Stateflow User's Guide, Version 4", The Math Works, Inc., Copyright 1997-2001.

T. Dean Hendrix and James H. Cross; Language Independent Generation of Graphical Representations of Source Code; Proceedings of the 1995 ACM 23rd annual conference on Computer Science; 1995; pp. 66-72.

"LabVIEW Evaluation Guide"; National Instruments; Jan. 1998.

Gregory S. Cunningham, Kenneth M. Hanson, G. R. Jennings, and D. R. Wolf; "An Object-Oriented Implementation of a graphical-programming system"; Proceedings of The International Society for Optical Engineering on Medical Imaging; 1994; p. 914-923; vol. 2167.

Hugo Andrade and Scott Kovner; "Software Synthesis from Dataflow models for G and LabVIEW"; IEEE Asilomar Conference on Signals, Systems, and Computers; Nov. 1998; pp. 1705-1709; vol. 2.

K. N. Whitley and Alan F. Blackwell; "Visual Programming; The Outlook from Academia and Insutry"; Seventh workshop on Empirical studies of programmers; Oct. 1997; pp. 180-208.

* cited by examiner

AUTOMATIC GENERATION OF A GRAPHICAL PROGRAM WITH A STRUCTURE NODE IN RESPONSE TO RECEIVING A DIAGRAM WITH STATES AND STATE TRANSITIONS

PRIORITY CLAIM

This application is a continuation of U.S. Pat. application Ser. No. 11/683,568, titled "Generating a Hardware Description from a Graphical Program in Response to Receiving a Diagram with States and State Transitions", filed Mar. 8, 2007, whose inventors were Jeffrey L. Kodosky and Kevin Hogan, which is a continuation of U.S. Pat. application Ser. No. 09/747,091, now U.S. Pat. No. 7,200,838, titled "System and Method for Programmatically Generating a Graphical Program in Response to a State Diagram", filed Dec. 21, 2000, whose inventors were Jeffrey L. Kodosky and Kevin Hogan, which is a continuation-in-part of U.S. Pat. application Ser. No. 09/745,023, now U.S. Pat. No. 7,210,117, titled "System and Method for Programmatically Generating a Graphical Program in Response to Program Information", filed Dec. 20, 2000, whose inventors were Ram Kudukoli, Robert Dye, Paul F. Austin, Lothar Wenzel, and Jeffrey L. Kodosky.

FIELD OF THE INVENTION

The present invention relates to the field of graphical programming, and more particularly to a system and method for programmatically generating a graphical program in response to state diagram information.

DESCRIPTION OF THE RELATED ART

Traditionally, high level text-based programming languages have been used by programmers in writing application programs. Many different high level programming languages exist, including BASIC, C, JAVA, FORTRAN, PASCAL, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, BASIC, JAVA, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

As graphical programming environments have matured and grown in popularity and complexity, it has become increasingly desirable to provide high-level tools which help a user create a graphical program. In particular, it would be desirable to provide a system and method for automatically generating a graphical program based on a state diagram (or automatically "translating" a state diagram to a graphical program).

A state diagram, also referred to as a state transition diagram, is a well-known type of diagram understood and used by many practitioners of various scientific and engineering disciplines. A state diagram comprises a finite number of "states", which are typically drawn on the diagram as ovals or circles, as well as a finite number of "transitions", which are drawn as arrows. Each transition arrow may begin on the edge of one state oval and end on the edge of another (or the same) state oval.

When used to describe the operation of a computer program, each state may represent some instruction or sequence of instructions that is executed when the state is "active". Note that these instructions are not explicitly specified on the state diagram. Each state may simply have a text label that succinctly summarizes the functionality of the state, such that a reader of the state diagram understands the operation of the program which the state diagram represents.

When the code for an active state has completed execution, the program then needs to decide which state will become the new "active" state. This decision process is completely described by the transitions that exit the (old) active state. Each transition arrow that begins on the edge of the active state's oval represents a condition that could be either true or false. If the corresponding condition is true when the active state is finished, the program chooses the state that the transition arrow points to as the next active state. (If the program follows a particular transition arrow to determine the next active state, that transition is called the "active" transition.) The transition arrows in a state diagram may also be labeled with text to help a reader of the state diagram to understand the conditions associated with various transition arrows.

The state diagram may also specify an initial state that will be active when the program begins execution. This may be done in various ways, for example, by drawing the initial state oval with a special style, e.g., bold, or by adding an arrow which ends on the initial state oval, but begins on a special "Start" marker oval which is distinct from the state ovals. In the latter instance, the arrow from the "Start" marker to the initial state oval has no condition associated with it; i.e., the oval to which this arrow points is unconditionally the initial active state. The state diagram may also indicate where the program will stop. This may be done in various ways, e.g., by introducing special "Stop" marker ovals which are distinct from the state ovals and the "Start" marker. To indicate that the program may stop when a particular state finishes execution, there may be a transition arrow from that state to a "Stop" marker. Note that a transition to a "Stop" marker, like all transitions except the one from the "Start" marker, does have a condition associated with it.

In theory, when a state has finished executing its code, one and only one of the conditions for the transition arrows exiting that state would be true, i.e., one and only one transition would be "active" at the end of the state's execution. However, in practice it is difficult for the creator of a state diagram to ensure that a general collection of Boolean (True/False) conditions is mutually exclusive (i.e., that only one of them may be true). Hence, when creating a state diagram, the creator may establish a priority ordering among the transition conditions for a state, such that the first transition condition (in priority order) that evaluates as true becomes the active transition and thus determines the next active state. In order to ensure that at least one transition is active, each state may have a default transition, whose condition is always true, that comes last in the priority ordering.

FIG. 1 (prior art) illustrates an exemplary state diagram that specifies the operation of a computer program that tests whether numbers are prime numbers. As indicated by the "Start" marker, the program begins execution with "Choose Number" as the active state. This state might, for example, wait for the user to enter a number. At the end of this state, there are several transitions that could become active. If the user indicates that he wishes to test the number to see if it is prime (e.g., by pressing a "Test Primality" button), then "divide by N" becomes the active state. If the user indicates that he wishes to stop the program (e.g., by pressing a "stop" button), the program immediately stops, as indicated by the "Stop" marker.

It is possible that neither of the above transition conditions are true (e.g. if the user has pressed neither button). In this case, the default transition arrow returns again to the "Choose Number" state, so that the program waits for the user to press a button. It is also theoretically possible for both conditions to be true. Thus, as noted above, a priority ordering may be specified for the three transition arrows. In this case, the "Stop program?" transition arrow may have the highest priority, indicating that if its corresponding condition is true, then this transition becomes the active transition regardless of whether or not any other transition condition is true. As noted above, the "default" transition arrow has the lowest priority, since its condition is always true. Note that in FIG. 1, the transition arrow priorities are not indicated on the state diagram.

If the "Divide by N" state becomes active, the chosen number is divided by an internal variable "N", which may initially be set to 2. When this division is completed, the program checks to see whether the user wishes to stop the calculation (e.g., by checking whether a "stop calculation" button is pressed). If so, the "cancel calculation" transition becomes active, and the program re-enters the "Choose Number" state. If not, and "N" evenly divided the given number, the "divisible by N" transition becomes active, and the program enters the "Number is NOT prime" state, wherein a message indicating that the number is not prime may be displayed. If none of these conditions are true, the program enters the "increase N" state, wherein the variable N is incremented by 1. If N is greater than the given number, then the number must be prime and thus enters the "Number is Prime" state, wherein a message indicating that the number is prime may be displayed. Otherwise, the program returns to the "Divide by N" state to test divisibility of the chosen number by the incremented value of N.

Thus, the state diagram of FIG. 1 represents a significant amount of program behavior in a simple, easily understood diagram. However, this behavior is represented at a very high level, and a state diagram is not an executable program. It would thus be desirable to enable a user to "translate" a state diagram into a graphical program. As described above, in prior systems, a user typically creates a graphical program within a graphical programming environment by interactively or manually placing icons or nodes representing the desired blocks of functionality on a diagram, and connecting the icons/nodes together. In contrast, it would be desirable to provide a system and method for programmatically generating a graphical program based on a state diagram, with little or no user input required.

A state diagram may not explicitly specify the program instructions or functionality to be performed when each state is active, and thus it may not be possible to generate a complete graphical program implementing the functionality represented by the state diagram. In this instance, users may greatly benefit from the automatic generation of a graphical program "skeleton" that provides a framework for the various states and transitions (and relationships among these) of the state diagram. The desired source code for each state and the desired source code specifying the conditions for each transition can then be filled in (manually) to complete the graphical program.

SUMMARY OF THE INVENTION

One embodiment of the present invention comprises a system and method for programmatically generating a graphical program in response to state diagram information. The state diagram information preferably represents a state diagram (also called a "state flow diagram"), wherein the state diagram models or represents a desired algorithm or method. The state diagram may comprise a conventional state diagram or a sequential function chart (SFC). The state diagram may represent desired operation of a software program or desired operation of a hardware device, or both. In one embodiment, the state diagram may represent a higher level representation of a desired algorithm than even a graphical program, and the present invention may be used to convert the state diagram into a graphical program or a graphical program framework. The state diagram information may specify a plurality of states and state transitions, wherein each state transition specifies a transition from a first state to a second state. The state diagram information may also specify an initial active "start" state and one or more "stop" states. For each state, the state diagram information may also specify a priority ordering among transitions exiting from the state.

A graphical program generation program, referred to herein as a "GPG program", may be executed, wherein the GPG program may be operable to receive the state diagram information. In response to the state diagram information, the GPG program may automatically, i.e., programmatically, generate a graphical program (or graphical program portion or graphical program framework) based on the state diagram information. Thus, the GPG program may generate different graphical programs, depending on the state diagram information received.

In programmatically generating a graphical program, the GPG program may programmatically generate a block diagram portion. Programmatically generating the block diagram portion of the graphical program may comprise programmatically including graphical source code in the block diagram. This graphical source code may serve as a framework of the states specified by the state diagram information and the state transitions among the states.

During execution of the graphical program, for each state, program instructions may be executed when that state is active. In one embodiment these instructions (and the functionality performed by these instructions) may not be specified by the state diagram information. Thus, the GPG program may not automatically generate a complete graphical program that implements the functionality that the state diagram is intended to represent. In this instance, the graphical source code framework automatically generated by the GPG program may be organized to correspond to the state diagram information and may include various "placeholders" or "containers" enabling the user to easily fill in the graphical program with source code that specifies execution instructions for each state and Boolean conditions for each state transition.

In an alternative embodiment, the state diagram information may include additional information that can be used to generate a more complete graphical program. For example, when creating a state diagram using a state diagram editor, the user may associate program code with one or more states in the state diagram, e.g., by dragging and dropping program code icons from a palette onto the desired states, or by using a dialog box to associate the program code with the states, etc. The program code associated with a state may specify code to be executed when the state is active and/or may specify transition condition code. The program code may comprise various types of executable or source modules, such as a graphical sub-program, DLL or other shared library, Java class, etc. The GPG program may include the program code in the generated graphical program or may enable the generated graphical program to interface with the program code.

The programmatically generated graphical program or graphical source code framework may be implemented in any of various ways. In various embodiments, the generated graphical program may be associated with any of various graphical programming development environments. Thus, the specific graphical source code that is automatically generated may depend on programming features supported by the particular graphical programming development environment with which the program is associated. Examples of generating graphical source code for the LabVIEW graphical programming development environment are included.

The GPG program that generates the graphical program may be constructed using any of various programming languages, methodologies, or techniques. For example, the GPG program may itself be a graphical program, or the GPG program may be a text-based program, or the GPG program may be constructed using a combination of graphical and text-based programming environments.

Also, the GPG program may receive the state diagram information in any of various ways. In one embodiment, the GPG program may include, may be associated with, or may be, a program used to construct the state diagram, e.g., a state diagram editor program. For example, a user may utilize a state diagram editor to construct a desired state diagram and may then request a graphical program based on the state diagram to be automatically created. For example, the user may select a menu option to generate the graphical program. In response to the user's request, the state diagram editor may execute program instructions to programmatically generate the graphical program or may invoke a separate module or program to perform the generation of the graphical program, passing the state diagram information (or a reference to the information) to this separate module or program. In another embodiment, a user may invoke the GPG program separately and request the GPG program to generate the graphical program, e.g., by specifying a previously created state diagram file. The GPG program may be operable to receive the state diagram information in any of various formats, e.g., as binary data, XML data, text data, etc. The GPG program may process the state diagram information to determine the specified states of the state diagram, the state transitions, etc.

In one embodiment, the graphical program may be dynamically (programmatically) updated as the state diagram is being interactively constructed by the user. For example, when the state diagram editor is launched or creates a new state diagram, the new state diagram may begin as a simple diagram having a single initial state. A simple graphical program corresponding to this initial state diagram may be programmatically generated. For example, a graphical programming development application may be launched and the programmatically generated graphical program may automatically appear in this application. As the user performs various actions in the state diagram editor, such as adding or deleting states, adding or deleting transitions, changing the destination state of a transition, etc., the corresponding graphical program may be dynamically (programmatically) updated to reflect the change.

In one embodiment, the generated graphical program may be "locked", requiring the user to explicitly unlock the graphical program before certain modifications to the graphical program can be made within the graphical programming environment. Locking the graphical program may ensure that the program's graphical source code is in a state known or expected by the GPG program, thus facilitating the dynamic update of the graphical program. For example, in one embodiment, the user may be allowed to add source code to the graphical program that specifies execution instructions for each state and Boolean conditions for each state transition, and may also be allowed to resize objects created by the GPG program, but may be prevented from modifying the topology of the framework programmatically generated by the graphical program until the graphical program is unlocked.

In various embodiments, the GPG program may be operable to generate any of various types of graphical programs. As noted above, a generated graphical program may be targeted toward a particular graphical programming development environment. The GPG program may thus utilize proprietary features or create files that are formatted in a manner expected by the graphical programming development environment. This may be desirable or necessary when the graphical programming development environment includes a runtime environment that is required for the created graphical program to execute. Examples of graphical programming development environments include LABVIEW, BridgeVIEW, DASYLAB, and DIADEM from National Instruments, VEE from Agilent, SIMULINK from The MathWorks, Softwire from Measurement Computing, Inc., SANSCRIPT from Northwoods Software, WiT from Coreco, and Vision Program Manager from PPT Vision, among others.

A graphical program programmatically generated based on a state diagram may be executed in any computing environment that supports the execution of graphical programs. For example, in one embodiment, the generated graphical program may be associated with a graphical programming development environment that supports downloading graphical programs for execution on reconfigurable or embedded hardware, such as hardware that includes configurable logic, such as a programmable logic device (PLD), e.g., an FPGA, or a processor and memory, which may execute a real time operating system. Among engineers who design algorithms to execute on embedded hardware, state diagrams are a popular means for representing algorithms. Thus, an engineer may design an algorithm at a very high level as a state diagram, and this state diagram may be programmatically translated into a graphical program whose high-level algorithmic design is based on the state diagram, for execution in various computing environments.

In various embodiments, the graphical program may be generated using any of various methods or techniques. Generating the graphical program may comprise generating one or more files or data structures defining the graphical program. When a user interactively develops a graphical program from within a graphical programming environment, the graphical programming environment may create one or more program files. For example, the program files may specify information such as a set of nodes included in the graphical program, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files or data structures representing the graphical program, wherein these files may be structured or formatted appropriately for a particular graphical programming environment.

In one embodiment, a graphical programming development environment may provide an application programming interface (API) which is used in programmatically generating the graphical program. For example, for each node, programmatic structure, or other object of the graphical program, the API may be called to programmatically add the object to the graphical program, connect the object to other objects of the graphical program, etc. Thus, any necessary files or other constructs needed by the graphical programming environment in order to use the generated graphical program may be automatically created as a result of calling the API.

BRIEF DESCRIPTION OF THE DRAWINGS

A better understanding of the present invention can be obtained when the following detailed description of the preferred embodiments is considered in conjunction with the following drawings, in which.

Figure 1:
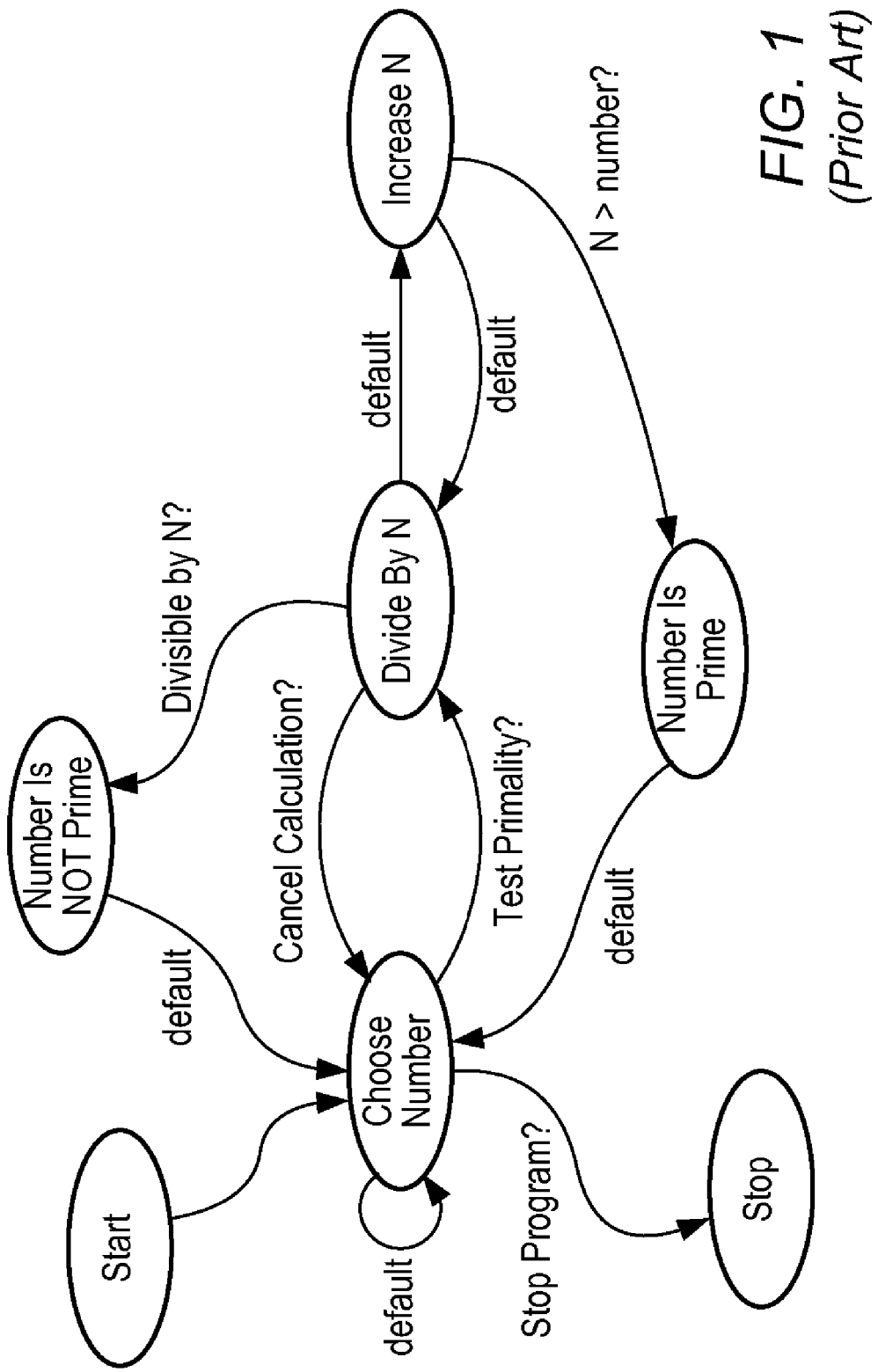
FIG. 1 (prior art) illustrates an exemplary state diagram.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. patent application Ser. No. 09/745,023 titled "System and Method for Programmatically Generating a Graphical Program in Response to Program Information" filed on Dec. 20, 2000, whose inventors were Ram Kudukoli, Robert Dye, Paul F. Austin, Lothar Wenzel, and Jeffrey L. Kodosky.

U.S. patent application Ser. No. 09/747,091, titled "System and Method for Programmatically Generating a Graphical Program in Response to a State Diagram", filed Dec. 21, 2000, whose inventors were Jeffrey L. Kodosky and Kevin Hogan.

U.S. patent application Ser. No. 09/518,492 titled "System and Method for Programmatically Creating a Graphical Program" filed on Mar. 3, 2000, whose inventors were Ram Kudukoli, Robert Dye, Melanie Jensen, and Yumiko Kawachi.

U.S. patent application Ser. No. 09/595,003 titled "System and Method for Automatically Generating a Graphical Program to Implement a Prototype" filed on Jun. 13, 2000, whose inventors were Nicolas Vazquez, Jeffrey L. Kodosky, Ram Kudukoli, Kevin L. Schultz, Dinesh Nair, and Christophe Caltagirone.

U.S. patent application Ser. No. 08/912,445 titled "Embedded Graphical Programming System" filed on Aug. 18, 1997, whose inventors were Jeffrey L. Kodosky, Darshan Shah, Samson DeKey, and Steve Rogers.

U.S. patent application Ser. No. 08/912,427 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

Figure 2:
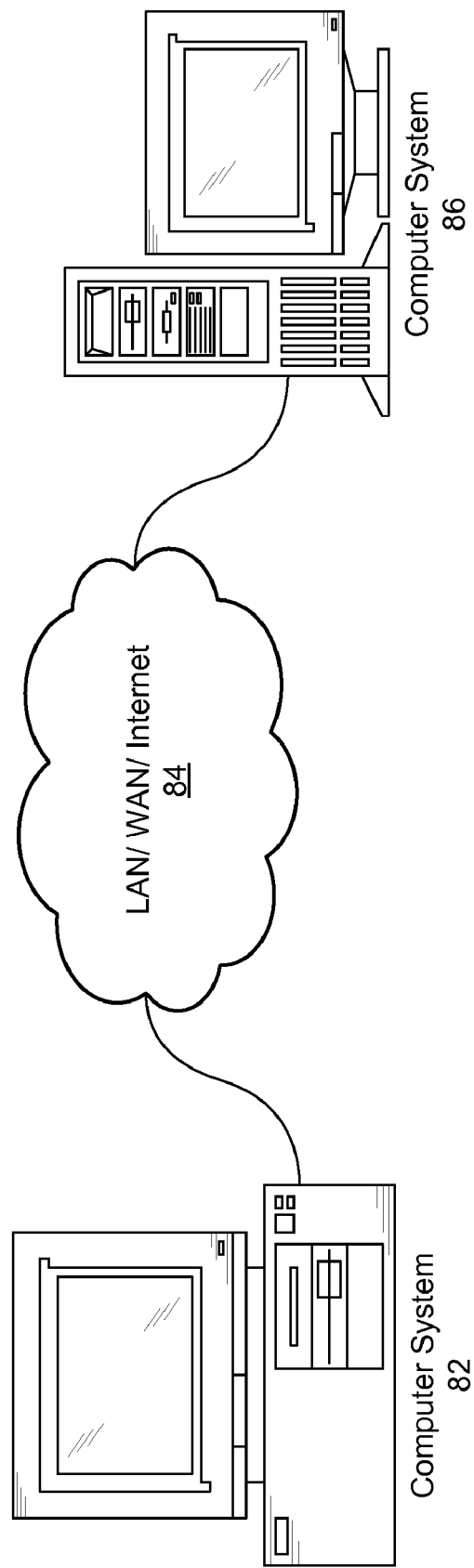
FIG. 2 illustrates a computer system connected through a network to a second computer system.

FIG. 2—Computer System Connected to a Network

FIG. 2 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 may include or store a computer program (or programs), referred to herein as a graphical program generation program, or a "GPG program", that is operable to receive state diagram information and programmatically generate a graphical program based on the state diagram information. One embodiment of a method for programmatically generating a graphical program is described below.

In one embodiment, the GPG program may be implemented as a self-contained program or application that includes all necessary program logic for generating the graphical program. In another embodiment, the GPG program may comprise a client portion and a server portion (or client program and server program), wherein the client portion may request or direct the server portion to generate the graphical program. For example, the client portion may utilize an application programming interface (API) provided by the server portion in order to generate the graphical program. In other words, the client portion may perform calls to the API provided by the server portion, and the server portion may execute functions or routines bound to these calls to generate the graphical program. In one embodiment, the server portion may be an instance of a graphical programming environment application. For example, the LabVIEW graphical programming environment application enables client programs to interface with a LabVIEW server in order to programmatically generate or modify graphical programs.

As used herein, the term "GPG program" is intended to include any of various implementations of a program (or programs) that are executable to programmatically generate a graphical program based on received state diagram information. For example, the term "GPG program" is intended to include an embodiment in which the GPG program is a self-contained program or application (not implemented as a client/server program) that includes all necessary program logic for programmatically generating a graphical program. The term "GPG program" is also intended to include an embodiment in which a combination of a client portion (or client program) and server portion (or server program) operate together to programmatically generate the second graphical program. The term "GPG program" is also intended to include other program implementations.

In an embodiment of the GPG program in which a client program interfaces with a server program to generate the graphical program, the server program may execute on the same computer system as the client program or may execute on a different computer system, e.g., a different computer system connected via a network. For example, in FIG. 2, the client program may execute on the computer system 82, and the server program may execute on the computer system 86. In this case, the graphical program, e.g., files representing the graphical program may be created on the computer system 82, or 86, or on a different computer system.

It is noted that the GPG program may be implemented using any of various programming technologies or methodologies. Where the GPG program is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

The GPG program may include a program (or program instructions) for creating the state diagram information upon which the programmatically generated graphical program is based, or the GPG program may be associated with or may interface with a separate program that creates the state diagram information. For example, in one embodiment, the GPG program (or the client portion of the GPG program) may include a state diagram editor program that allows a user to interactively construct a state diagram. For example, such a state diagram editor may allow the user to add and remove states, add and remove transition arrows between states, define an initially active start state, define stop states, assign a priority ordering to transitions exiting from a given state, etc. The state diagram editor may include a graphical user interface that displays the current state of the state diagram as the diagram is constructed.

In one embodiment, the state diagram editor may include a menu item or other means enabling the user to request a graphical program to be automatically generated based on the current state diagram. In another embodiment, the user may invoke the GPG program separately and request the GPG program to automatically create the graphical program, e.g., by specifying a file including the state diagram information.

In another embodiment, the graphical program may be dynamically (programmatically) updated as the state diagram is being interactively constructed by the user in the state diagram editor. For example, when the state diagram editor is launched or creates a new state diagram, the new state diagram may begin as a simple diagram having a single initial state. A simple graphical program corresponding to this initial state diagram may be programmatically generated. For example, the state diagram editor may interface with a graphical programming development application, causing the graphical programming development application to (possibly launch and) programmatically generate the initial graphical program, e.g., by calling an API provided by the graphical programming development application. Thus, the initial graphical program may appear in a window of the graphical programming development application.

As the user performs various actions in the state diagram editor, such as adding or deleting states, adding or deleting transitions, changing the destination state of a transition, etc., the corresponding graphical program may be dynamically (programmatically) updated within the graphical programming development application window to reflect the change. In one embodiment, the generated graphical program may be "locked", requiring the user to explicitly unlock the graphical program before certain modifications can be made to the graphical program within the graphical programming development application. Locking the graphical program may ensure that the program's graphical source code is in a state known or expected by the state diagram editor.

Figure 3A:
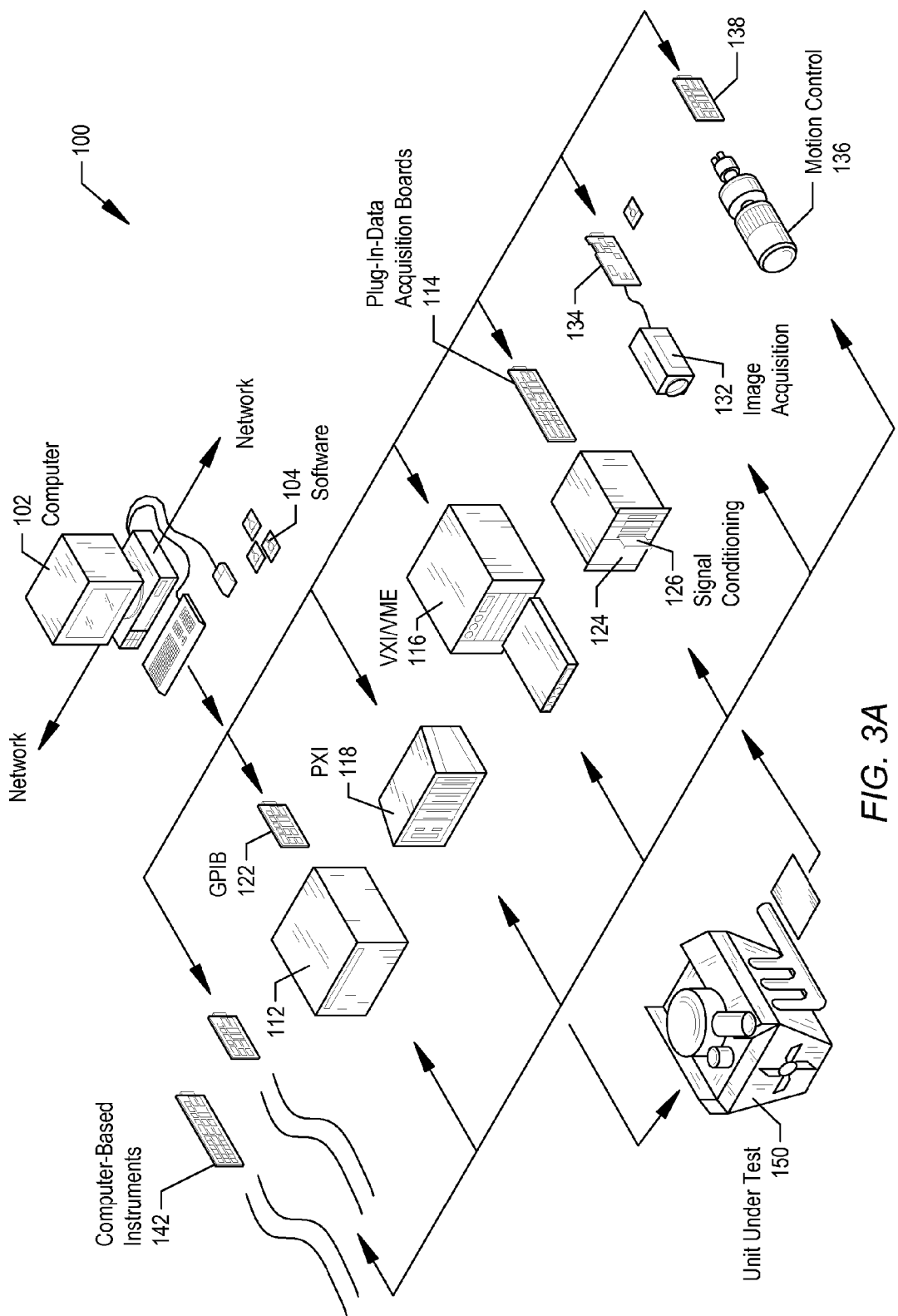
FIGS. 3A and 3B illustrate representative instrumentation and process control systems including various I/O interface options.
Figure 3B:
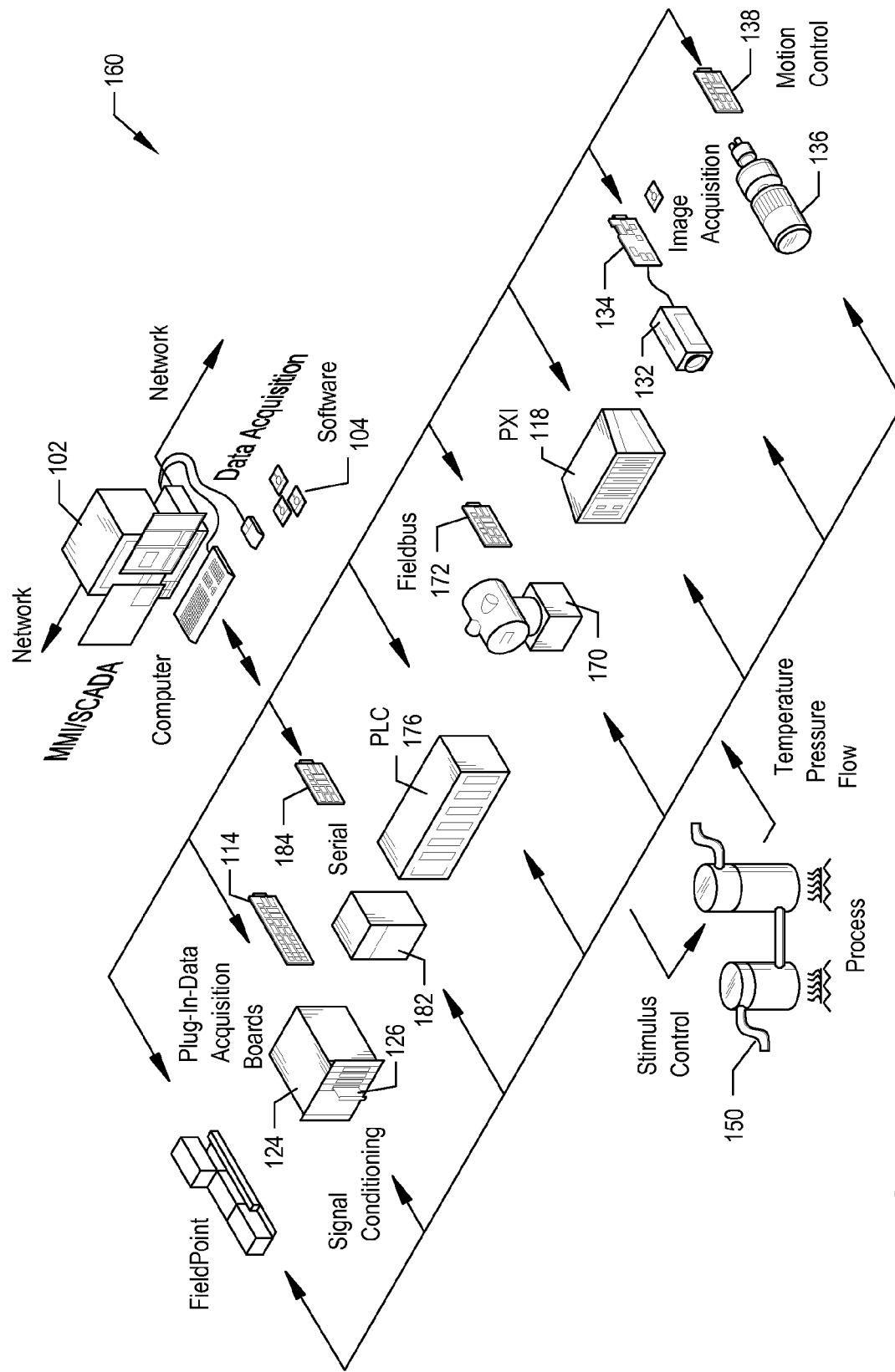

FIGS. 3A and 3B—Instrumentation and Industrial Automation Systems

FIGS. 3A and 3B illustrate exemplary systems which may store or use a state diagram editor program and/or a GPG program (which may be a GPG client program and/or a GPG server program) such as described above. Also, the systems of FIGS. 3A and 3B may execute a graphical program programmatically generated based on state diagram information. For example, the graphical program may perform an instrumentation function, such as a test and measurement function or an industrial automation function. It is noted that a state diagram editor program, GPG program, and/or a generated graphical program may be stored in or used by any of various other types of systems as desired and may implement any function or application as desired. Thus, FIGS. 3A and 3B are exemplary only.

FIG. 3A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may be either of the computers 82 or 86 shown in FIG. 2, which as described above are operable to programmatically generate graphical programs based on state diagram information. Also, in one embodiment, the computer 102 may execute a generated graphical program, such as a graphical program that controls or models one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 3B illustrates an exemplary industrial automation system 160. The industrial automation system 160 is similar to the instrumentation or test and measurement system 100 shown in FIG. 3A. Elements which are similar or identical to elements in FIG. 3A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may be either of the computers 82 or 86 shown in FIG. 2, which as described above are operable to programmatically generate graphical programs based on state diagram information. Also, in one embodiment, the computer 102 may execute a programmatically generated graphical program, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system(s) 102 preferably includes a memory medium(s) on which one or more computer programs or software components according to one embodiment of the present invention are stored. For example, the memory medium may store a GPG program which is executable to receive state diagram information and programmatically generate a graphical program based on the state diagram information. The memory medium may also store a state diagram editor program operable to create the state diagram information (or, as described above, the GPG program may include this functionality). The same or a different memory medium may also store a server program with which a client portion of the GPG program interfaces in order to generate the graphical program. The memory medium may also store a programmatically generated graphical program. The memory medium may also store a graphical programming development application operable execute or edit the programmatically generated graphical program. It is noted that various of these software programs may be stored on different computer systems, as described above with reference to FIG. 2. Also, in various embodiments, various of the above software programs may be implemented or combined in different ways. For example, a graphical programming development application may implement the server program with which a client program interfaces to programmatically generate a graphical program.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the state diagram editor, the GPG program, and/or the resulting graphical program that is programmatically generated may be designed or intended for data acquisition/generation, analysis, and/or display, and/or for controlling or modeling instrumentation or industrial automation hardware. For example, in one embodiment, the National Instruments LabVIEW graphical programming development application, which provides specialized support for developers of instrumentation applications, may act as the GPG server program. In this embodiment, the GPG client program may be a software program that receives and processes state diagram information and invokes functionality of the LabVIEW graphical programming environment to programmatically generate a LabVIEW graphical program.

However, it is noted that the present invention can be used for a plethora of applications and is not limited to instrumentation or industrial automation applications. In other words, FIGS. 3A and 3B are exemplary only, and graphical programs for any of various types of purposes may be programmatically generated based on any of various types of state diagram information, and the generated graphical programs may be stored in and may execute on any of various types of systems.

Figure 4:
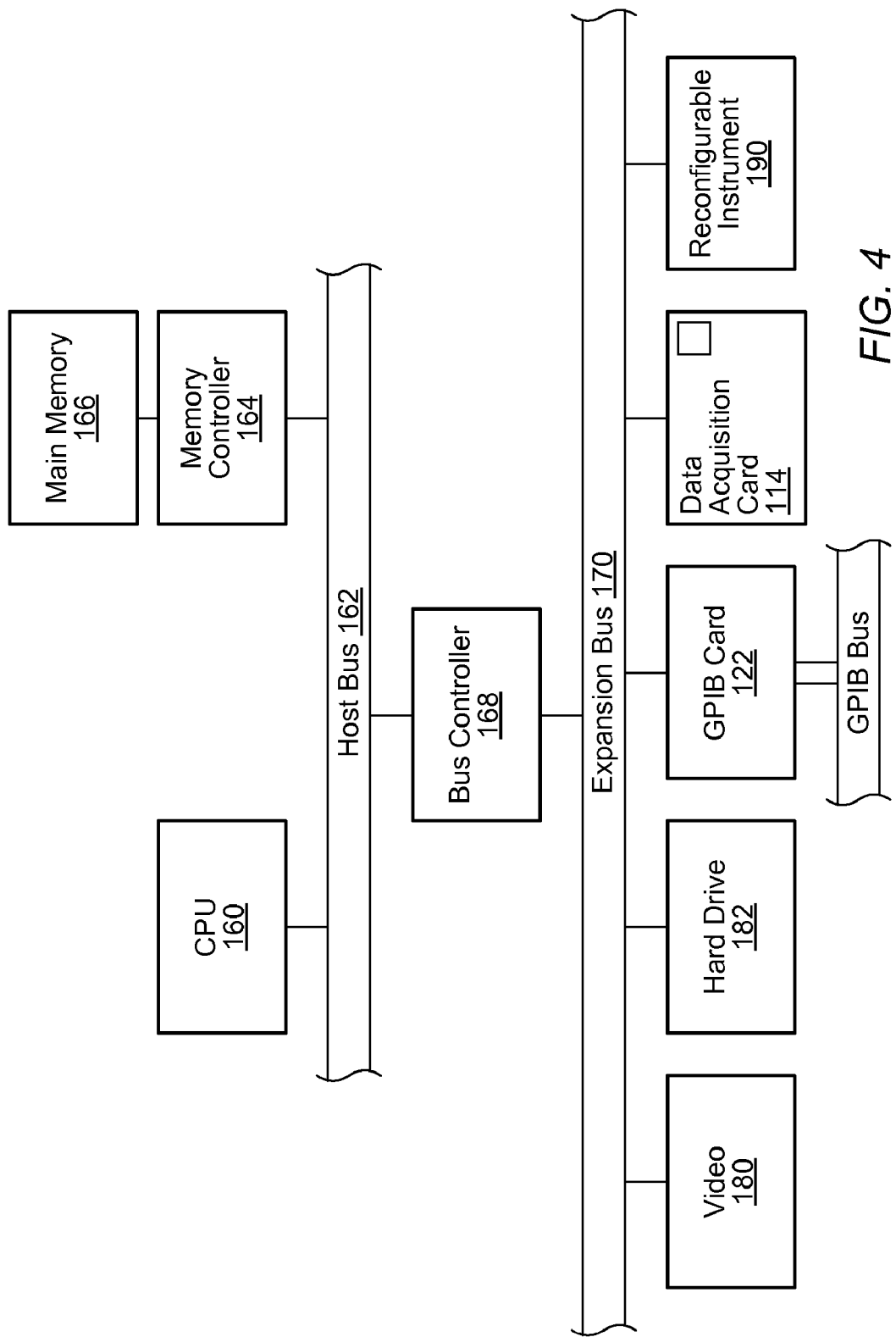
FIG. 4 is a block diagram of the computer system of FIGS. 1, 2A and 2B.

FIG. 4—Computer System Block Diagram

FIG. 4 is a block diagram of the computer system illustrated in FIGS. 2, 3A and 3B. It is noted that any type of computer system configuration or architecture can be used as desired, and FIG. 4 illustrates a representative PC embodiment. It is also noted that the computer system may be a general purpose computer system as shown in FIGS. 3A and 3B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention, e.g., as described above. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 3A) and a GPIB interface card 122 which provides a GPIB bus interface to the GPIB instrument 112 (of FIG. 3A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a graphical program programmatically generated based on state diagram information may be downloaded and executed on the reconfigurable instrument 190. For example, a graphical programming environment with which the graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 3A.

Among engineers who design algorithms to execute on embedded hardware, state diagrams are a popular means for representing algorithms. Thus, an engineer may design an algorithm at a very high level as a state diagram, and this state diagram may be programmatically translated into a graphical program or graphical program framework whose high-level algorithmic design is based on the state diagram. The resulting graphical program may then be executed in any computing environment that supports the execution of graphical programs, including embedded or reconfigurable hardware.

Figure 5:
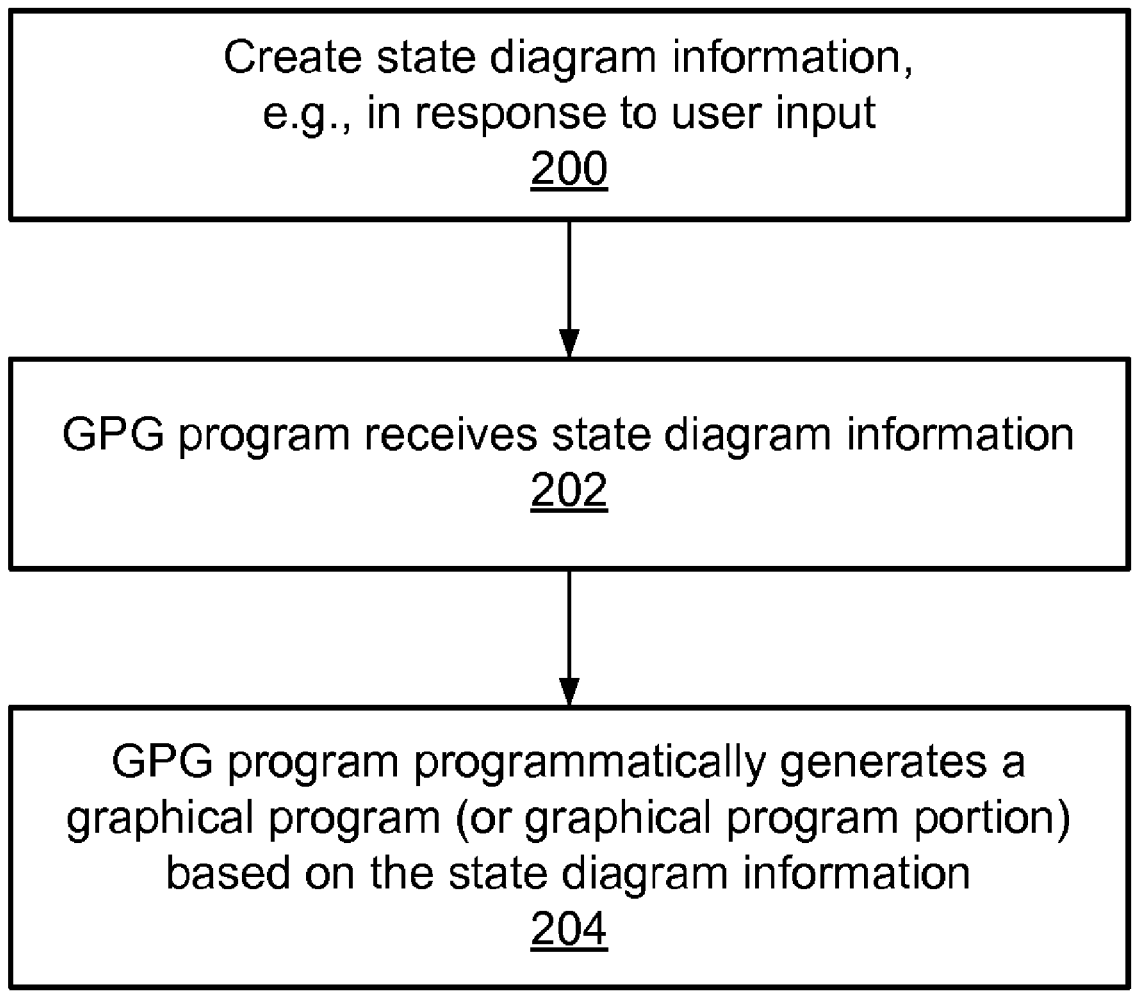
FIG. 5 is a flowchart diagram illustrating one embodiment of a method for programmatically generating a graphical program based on state diagram information.

FIG. 5—Programmatic Generation of a Graphical Program Based on State Diagram Information In prior systems, a user interactively or manually creates or edits a graphical program. For example, the user may interactively add various objects or icons to a graphical program block diagram, connect the objects together, etc. In contrast, one embodiment of the present invention comprises a system and method for programmatically generating a graphical program (or portion of a graphical program) without requiring this type of user interaction. FIG. 5 is a flowchart diagram illustrating one embodiment of a method for programmatically generating a graphical program based on state diagram information.

In step 200, state diagram information may be created, e.g., in response to user input. For example, as described above with reference to FIG. 2, the user may utilize a state diagram editor program that allows the user to create a state diagram. The state diagram editor may include a graphical user interface that displays the current state of the state diagram as the diagram is interactively constructed. In other embodiments, the state diagram information may be created in any of various other ways. A program having a graphical user interface that displays a state diagram corresponding to the state diagram information is not necessarily used. For example, the state diagram information may simply be created as a text file structured in such a way as to specify the states, state transitions, etc.

As used herein, the term "state diagram information" comprises information that specifies at least: one or more states; and one or more state transitions, wherein each state transition specifies a transition from a first state to a second state (wherein the first and second states may be the same). In various embodiments, the state diagram information may also specify information such as: an initially active start state; one or more stop states; a priority ordering for transitions exiting from a given state; etc.

The state diagram information preferably represents a state diagram (also called a "state flow diagram"), wherein the state diagram models or represents a desired algorithm or method. The state diagram information may also represent a sequential function chart (SFC). A sequential function chart is similar to a state diagram, with one exception being that multiple states can execute concurrently. The state diagram may represent desired operation of a software program or desired operation of a hardware device, or both. In one embodiment, the state diagram may represent a higher level representation of a desired algorithm than even a graphical program, and the present invention may be used to convert the state diagram into a graphical program or a graphical program framework.

Another example of a state diagram is a test sequence, e.g., where the test sequence is represented as a plurality of states representing the respective tests in the sequence as well as the transitions between the steps. As used herein, a "test sequence" specifies a sequence of executable test modules as well as transitions or flow between the test modules, wherein the test sequence is used to test a unit under test.

In step 202, a graphical program generation (GPG) program may receive the state diagram information created in step 200. It is noted that the GPG program is not necessarily separate from a program used to create the state diagram information. For example, a single program or application may include functionality for both creating the state diagram information and programmatically generating the graphical program (and/or invoking a server program to cause the graphical program to be programmatically generated). In other embodiments, the GPG program may be a separate program.

Thus, in various embodiments the GPG program may receive the state diagram information in any of various ways and from any of various types of sources. For example, the GPG program may be operable to read the state diagram information from a memory location in which the state diagram information was stored, or the state diagram information may be passed to the GPG program programmatically using standard programming techniques, or the GPG program may be operable to read the state diagram information from a file, etc. Also, in various embodiments, the received state diagram information may be structured or formatted in any way and may comprise various types of data, such as text data, binary data, XML data, etc.

In step 204, the GPG program may automatically, i.e., programmatically, generate a graphical program (or graphical program portion or graphical program framework) based on the received state diagram information. The graphical program may be programmatically generated with little or no user input received during this generating. In one embodiment, the graphical program is programmatically generated with no user input required. In another embodiment, the user may be prompted for certain decisions during programmatic generation, such as the type of graphical program to generate, the number or degree of comments contained within the graphical program, a file name for the graphical program, etc.

In programmatically generating the graphical program, the GPG program may specify the inclusion of various objects in the new graphical program, such as nodes and/or programmatic structures (e.g., loops, case structures, etc.) to include in a block diagram of the graphical program. The new graphical program may also include a user interface portion including various user interface objects, such as one or more user interface panels having controls for specifying user input to the graphical program and/or indicators for displaying output from the graphical program. As described above, block diagram objects in a graphical program are typically interconnected so as to visually indicate functionality of the program. Thus, the GPG program may also connect or wire the block diagram objects together appropriately. Also, the GPG program may specify positions and/or sizes of the objects (e.g., to create an easily readable block diagram), among other properties or configuration of the objects (e.g., configuration of data types, parameters, etc.).

In various embodiments, the GPG program may be operable to generate any of various types of graphical programs. The generated graphical program may be targeted toward a particular graphical programming development environment. Thus, in programmatically generating the program, the GPG program may utilize proprietary features or create files that are formatted in a manner expected by the graphical programming development environment. This may be desirable or necessary when the graphical programming development environment includes a runtime environment that is required for the generated graphical program to execute. Examples of graphical programming development environments include LABVIEW, BridgeVIEW, DASYLAB, and DIADEM from National Instruments, VEE from Agilent, SIMULINK from The MathWorks, Softwire from Measurement Computing, Inc., SANSCRIPT from Northwoods Software, WiT from Coreco, and Vision Program Manager from PPT Vision, among others.

Programmatically generating the graphical program may comprise generating one or more files or data structures defining the graphical program. When a user interactively develops a graphical program from within a graphical programming environment, the graphical programming environment may create one or more program files. For example, the program files may specify information such as a set of nodes included in the graphical program, interconnections among these nodes, programmatic structures such as loops, etc. In other cases, the program files may store various data structures, e.g., in binary form, which the graphical programming environment uses to directly represent the graphical program. Thus, in programmatically generating the graphical program, the GPG program may programmatically generate one or more files or data structures representing the graphical program, wherein these files may be structured or formatted appropriately for a particular graphical programming environment.

As described above, when a state diagram is used to represent the execution of a computer program, each state of the state diagram may correspond to a program instruction or sequence of instructions that may be executed when that state is active. However, in one embodiment these instructions (and the functionality performed by these instructions) may not be specified by the state diagram information, and the GPG program may not automatically generate a program that implements the complete functionality that the state diagram is intended to represent. In this instance, in programmatically generating the graphical program, the GPG program may generate graphical source code for the program that serves as a "framework" for the states specified by the state diagram information and the state transitions among the states. This graphical source code framework may be organized to correspond to the state diagram information and may include various "placeholders" or "containers" enabling the user to easily fill in the graphical program with source code that specifies the desired execution instructions for each state and the desired Boolean conditions for each state transition. As described below, in alternative embodiments, the state diagram information may include program information such that execution instructions for some or all of the states and state transitions can be automatically included in the graphical program.

In various embodiments, programmatically generated graphical code may be implemented or structured in any of various ways. Since, as described above, the generated graphical program may be associated with any of various graphical programming development environments, the specific graphical source code that is automatically generated may depend on programming features supported by the particular graphical programming development environment with which the program is associated. One embodiment of automatically generating a graphical source code framework for the LabVIEW graphical programming development environment is described below.

The GPG program that generates the graphical program may be constructed using any of various programming languages, methodologies, or techniques. For example, the GPG program may itself be a graphical program, or the GPG program may be a text-based program, or the GPG program may be constructed using a combination of graphical and text-based programming environments.

In one embodiment, the GPG program may be a self-contained program that includes all executable logic necessary for programmatically generating the new graphical program. However, in another embodiment, the GPG program utilizes a client/server programming model, in which the client portion creates and/or processes the state diagram information and determines the graphical program to be generated based on the state diagram information (i.e., determines the block diagram objects to be included in the program, the interconnections among these objects, etc.). The client portion may then call an API provided by the server portion to request the server portion to perform the actual creation of the new graphical program, e.g., by creating files and/or other data structures representing the new graphical program. The server portion may execute on the same computer system as the client portion or may execute on a different computer system, e.g., a different computer system connected by a network. In one embodiment, the server portion may be an instance of a graphical programming development environment application, which provides an API enabling client programs to programmatically create and/or edit graphical programs.

The method of FIG. 5 is illustrated and is described above in terms of generating a new graphical program. It is noted that a similar method may be used to modify an existing graphical program, e.g., in order to add functionality to the program. In other words, instead of specifying creation of a new graphical program, the GPG program may specify the modification of an existing graphical program. When executed, the GPG program is then operable to programmatically modify the existing graphical program. For example, the GPG program may include a reference to the existing graphical program and may perform various API calls to modify the graphical program, e.g., by adding one or more objects to the graphical program, changing connections between graphical program objects, changing various properties of graphical program objects, etc.

It is noted that FIG. 5 represents one embodiment of a method for programmatically generating a graphical program, and various steps may be added, reordered, combined, omitted, modified, etc.

Figure 6:
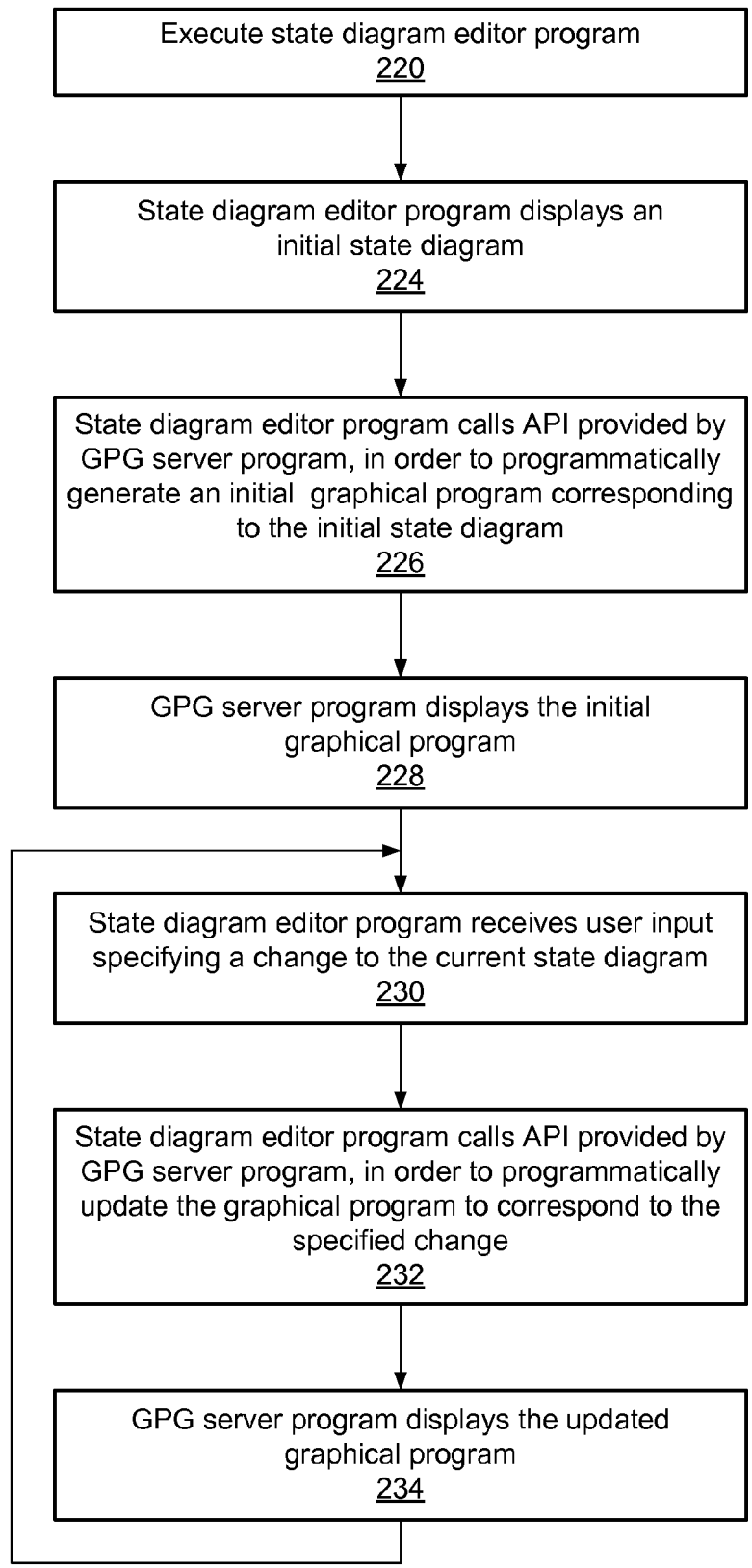
FIG. 6 is a flowchart diagram illustrating one embodiment of a method for dynamically (programmatically) updating a graphical program as a user interactively changes a state diagram on which the graphical program is based.

FIG. 6—Stepwise Programmatic Generation of a Graphical Program Based on State Diagram Information In one embodiment, a graphical program may be programmatically generated from a completed state diagram. In another embodiment, a graphical program may be programmatically generated as the state diagram is constructed. In other words, for each interactive change that a user makes to the state diagram, the graphical program may be updated to reflect this change. FIG. 6 is a flowchart diagram illustrating one embodiment of a method for dynamically (programmatically) updating a graphical program as a user interactively changes a state diagram on which the graphical program is based.

In step 220, a state diagram editor program may be executed. As described above, such a program may allow the user to construct a state diagram by performing actions such as: adding and removing states, adding and removing transition arrows between states, defining an initially active start state, defining stop states, assigning a priority ordering to transitions exiting from a given state, etc. The state diagram editor may include a graphical user interface that displays the current state of the state diagram as the diagram is constructed.

Figure 7:
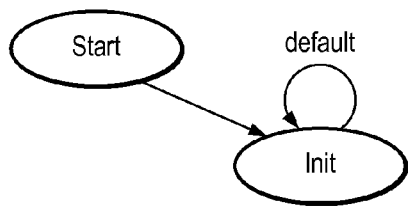
FIG. 7 illustrates an exemplary initial state diagram that may be displayed by a state diagram editor program, e.g., when the user requests to create a new state diagram.

In step 224, the state diagram editor program may display an initial state diagram. For example, when the state diagram editor program first launches or when the user requests to create a new state diagram, the editor program may display an initial state diagram, which the user may then change, e.g., by adding states and state transitions to the diagram. FIG. 7 illustrates an exemplary initial state diagram. In this example, the diagram includes a single state labeled "Init" with a default transition to itself and a "Start" marker to specify that this state is the initially active state.

In step 226, the state diagram editor may programmatically generate an initial graphical program corresponding to the initial state diagram. In one embodiment, the state diagram editor may interface with a GPG server program in order to request or direct the GPG server program to generate the initial graphical program. The GPG server program may provide an application programming interface (API) for programmatically generating graphical programs. In one embodiment, the GPG server program may be a graphical programming development environment application. For example, the LabVIEW graphical programming development environment application provides an API which client programs may use to programmatically generate or modify graphical programs.

In addition to programmatically generating the initial graphical program, the GPG server program may also be operable to display the initial graphical program, e.g., in a separate window, as shown in step 228. Thus, a user constructing a new state diagram via the state diagram editor program may be able to view the initial graphical program corresponding to the initial state diagram.

In step 230, the state diagram editor program may receive user input specifying a change to the state diagram. Various types of possible changes are listed above (e.g., adding a state, adding a transition, etc.)

In step 232, in response to the state diagram change performed in step 230, the state diagram editor may programmatically update the graphical program to correspond to the specified change, e.g., by calling an API of the GPG server program to perform the update. Thus, the API may enable not only the creation of a new graphical program, but may also allow modifications to an existing graphical program.

In step 234, the GPG server program may display the updated graphical program (or may re-display the updated graphical program in an existing window). Thus, as the user interactively changes the state diagram, the corresponding graphical program may be automatically changed also, such that the user can immediately see the results of the change. As indicated by the flowchart loop from step 234 to step 230, the process of the user changing the state diagram and automatically updating the graphical program in response may be an iterative process.

FIGS. 8-18: Examples of Programmatically Generated Graphical Source Code

As described above, in various embodiments, the programmatically generated graphical program may be associated with any of various graphical programming development environments, and the graphical source code included in the graphical program may vary depending on the particular development environment. FIGS. 9-18 illustrate exemplary graphical source code which may be programmatically generated for the LabVIEW graphical programming development environment. For more information on the operation of the illustrated LabVIEW graphical source code, please refer to the LabVIEW user documentation, available from National Instruments Corp., which is hereby incorporated by reference.

The text accompanying these figures describes various changes that a user may make to a state diagram and the results of these changes on the graphical source code. Thus, in one embodiment the LabVIEW graphical program may be progressively updated as a user edits the state diagram, as described above with reference to FIG. 6. In another embodiment, the entire LabVIEW graphical program may be generated a single time from a completed state diagram, if desired.

Figure 8:
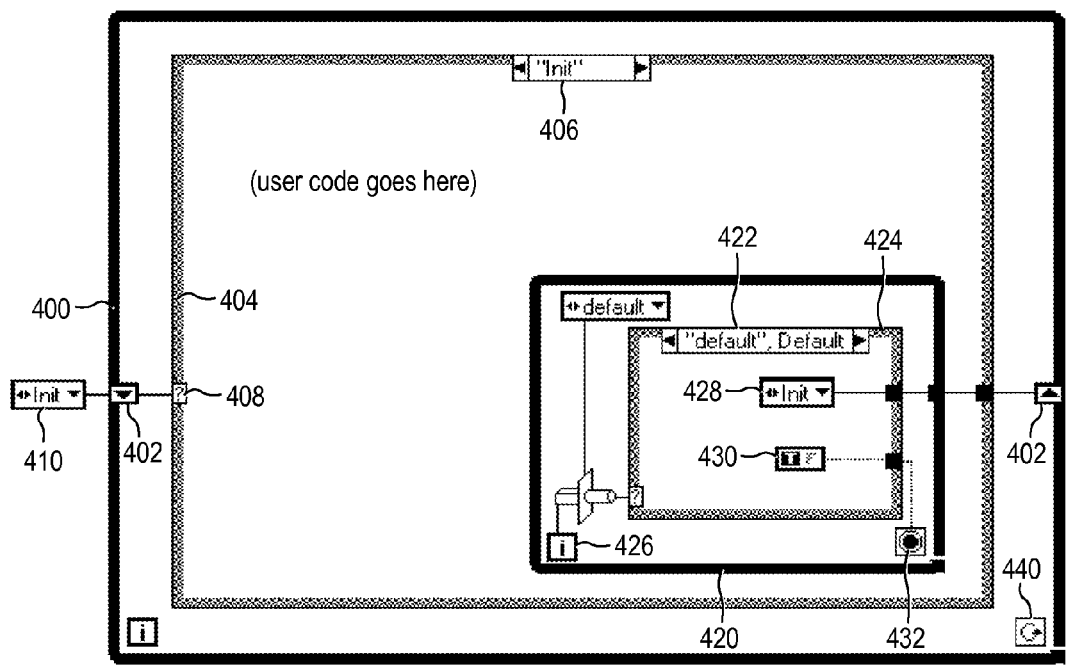
FIG. 8 illustrates exemplary LabVIEW graphical program source code that may be programmatically generated based on the initial state diagram shown in FIG. 7.

FIG. 8—Initially Generated Graphical Program

FIG. 8 illustrates exemplary LabVIEW graphical program source code which may be programmatically generated based on the initial state diagram shown in FIG. 7 (i.e., this code may be generated and displayed in steps 226 and 228 of FIG. 6).

The graphical source code for this default diagram comprises a large "While" loop programmatic structure 400 with a shift register 402. (A shift register is a local variable that feeds back or transfers values from the completion of one iteration of the loop to the next. The shift register includes a pair of terminals 402 opposite each other on the vertical sides of the loop border. The right terminal stores the data at the completion of an iteration. LabVIEW shifts that data at the completion of an iteration, and the data appears in the left terminal, in time for the next iteration. The shift register may be initialized by wiring a constant value 410 from outside the loop to the left terminal.)

A "Case" programmatic structure 404 is also included inside the while loop 400. In principle, a LabVIEW case structure is similar to a case statement in the C programming language. The Case structure can have multiple subdiagrams, configured like a deck of cards, of which only one is visible at a time. At the top of the structure border is displayed a diagram identifier 406 that displays the value causing the currently displayed subdiagram to execute. By clicking the decrement and increment buttons to the left and right, respectively, of the diagram identifier, the user can cycle through the subdiagrams of the case structure. During execution, the value wired to the case selector 408 determines which subdiagram (i.e., which "case") executes.

In the program of FIG. 8, the shift register 402 stores an enumerated data type which specifies the current "active" state of the program, wherein there is exactly one enumerated type entry for each state in the state diagram. (As described below, there may also be one extra entry if any "Stop" marker is added to the state diagram). The shift register value is wired to the case selector 408, which selects the appropriate subdiagram code to execute for the current active state. Notice that the shift register is initialized with a constant value 410 from the enumerated type to reflect the initial active state specified in the state diagram; i.e., it is initialized to the "Init" state pointed to by the "Start" marker in FIG. 7.

The case structure 404 includes one case or subdiagram for every state in the state diagram. Thus, for the default diagram of FIG. 7, there is only one case listed in this structure—the case for the "Init" state (indicated by the diagram identifier 406). As described below, when the user adds a state to the state diagram, a corresponding case or subdiagram is added to the case structure 404.

The subdiagram for the "Init" state (and for future states added as the user adds states to the state diagram) is left mostly empty, to allow the user to specify exactly what set of instructions should be executed when this state becomes active. As noted above, in one embodiment these instructions may not be specified explicitly in the state diagram, and the instructions may not be automatically included in the generated graphical program. Thus, the programmatically generated subdiagram for each case may serve as a "placeholder" or "container" where the user can add source code to perform the desired functionality for when that case is active, as indicated in FIG. 8. In other embodiments, e.g., when generating graphical source code for other graphical programming development environments, this type of "placeholder" or "container" code may be implemented in any of various other ways. Also, as noted above, in alternative embodiments source code defining the functionality for when a case is active may be generated automatically.

Since information about possible transitions between states is specified in the state diagram, it is possible to automatically generate most of the code needed to determine the next active state. After the user-added code for the active state executes, this programmatically generated code executes to determine the next active state. The programmatically generated code for evaluating transition conditions is included within a while loop 420. The while loop 420 uses an enumerated data type 422 which is unique to the state which corresponds to the particular case subdiagram currently displayed. This enumerated type 422 includes exactly one entry for each transition that leaves the state that corresponds to the currently displayed case. (Thus, in the initial graphical program, there is only an entry for the default transition shown in FIG. 7).

In one embodiment, the entries of the enumerated type 422 may be ordered by transition priority, if such a priority is specified in the state diagram. Higher priority transitions may have lower values in the enumeration. Thus, when the while loop 420 executes, the values of the enumerated type 422 are fed, one by one, in order from highest priority value to lowest, into a case structure 424. This is done by converting the (integer) values from the loop index terminal 426 into the transition enumerated data type. The case structure 424 includes one case subdiagram for each transition, and has two output values: the value 428 of the new active state (assuming the condition for this transition evaluates to be true), and the Boolean value 430 of the condition for this transition.

The value 430 of the transition condition is passed to the conditional terminal 432 of the while loop 420, which causes the while loop 420 to terminate if the condition value 430 is true. When the while loop 420 terminates, the value 428 for the new active state is passed out of the while loop 420 and into the right terminal of the shift register 402, thus specifying the value of the new active state for the next iteration of the outer while loop 400. Thus, the inner while loop 420 evaluates transition conditions from highest priority to lowest, and as soon as a "true" condition is encountered, it selects the new active state specified by that transition.

Note that in the case of the default state diagram of FIG. 7, the only transition out of the "Init" state is the default transition. As described above, by definition, the condition for a default transition is always true. Thus, in FIG. 8, a Boolean constant of "True" is generated as the condition value. As shown in FIG. 7, the new active state for the default transition is again the "Init" state. Thus, the "Init" enumerated value is generated as the value of the new active state. For transitions other than a default transition, the state diagram may not specify what Boolean conditions are associated with the transition. Thus, for other transitions, the user may need to add graphical source code so that the transition evaluates to the desired Boolean value during execution. As described below, in some embodiments, it may be possible to automatically generate such source code.

Once all of the code for the current case subdiagram of the large case structure 404 has finished execution, the condition terminal 440 of the outer while loop 400 is evaluated to determine whether or not the program should continue execution. Since the default state diagram of FIG. 7 has no "Stop" marker to denote when the program should stop, this terminal 440 is left unwired in the FIG. 8 LabVIEW diagram. This leaves the user free to add any kind of termination condition desired, e.g., by wiring in a "Stop" button which can halt the execution of the program at the end of any state. If the program does not stop, the while loop 400 performs another iteration, executing code for the new active state and then evaluating the transitions for that state.

From the initial state diagram of FIG. 7, the user may edit the diagram. For example, in various embodiments the user may edit the diagram by adding a state, adding a transition, changing the destination state of an existing transition, re-ordering the priority of transitions that originate from a particular state, renaming a state or transition, deleting a state or transition, adding or deleting a "Stop" marker, etc. FIGS. 9-18 illustrate various state diagram changes and changes to the graphical program which may be programmatically performed in response to these state diagram changes.

Figure 9:
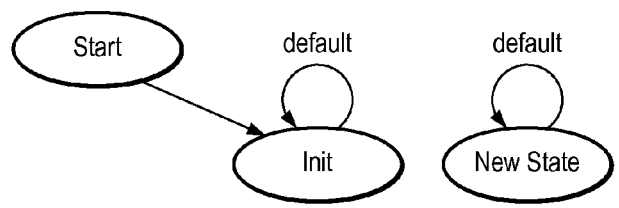
FIGS. 9-18 illustrate various state diagram changes and illustrate changes to the corresponding LabVIEW graphical program that may be programmatically performed in response to these state diagram changes.
Figure 10:
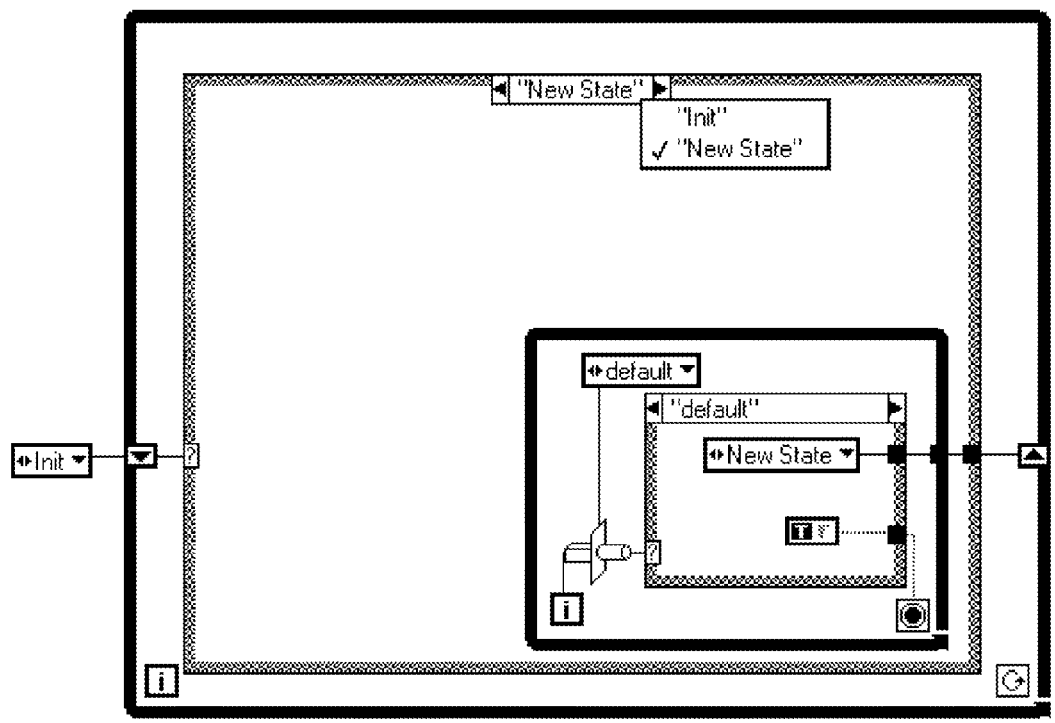

FIGS. 9-10: Adding a State

FIG. 9 illustrates a state diagram in which a new state has been added to the state diagram of FIG. 7. As shown, the new state may initially have a default transition returning to itself. To update the graphical program, it is necessary to programmatically add a new entry in the enumerated type for states. In addition, it is necessary to programmatically add a new case subdiagram corresponding to the new state to the outer case structure 404. FIG. 10 illustrates the programmatically updated LabVIEW code after these changes have been made, in which the "New State" state is selected as the current subdiagram for the case structure 404. This subdiagram appears substantially similar to the one shown in FIG. 8, except for the case (the name of the state) identified by the diagram identifier 406 and the new active state specified by the default transition (i.e., "New State" instead of "Init").

Figure 11:
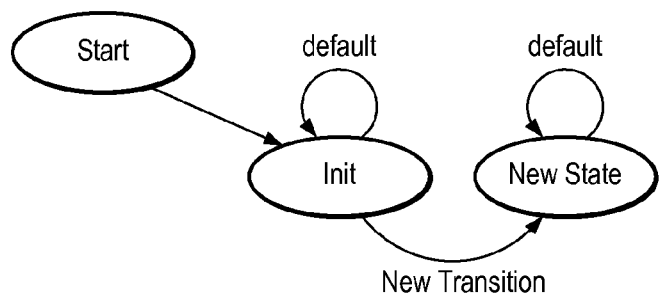
Figure 12:
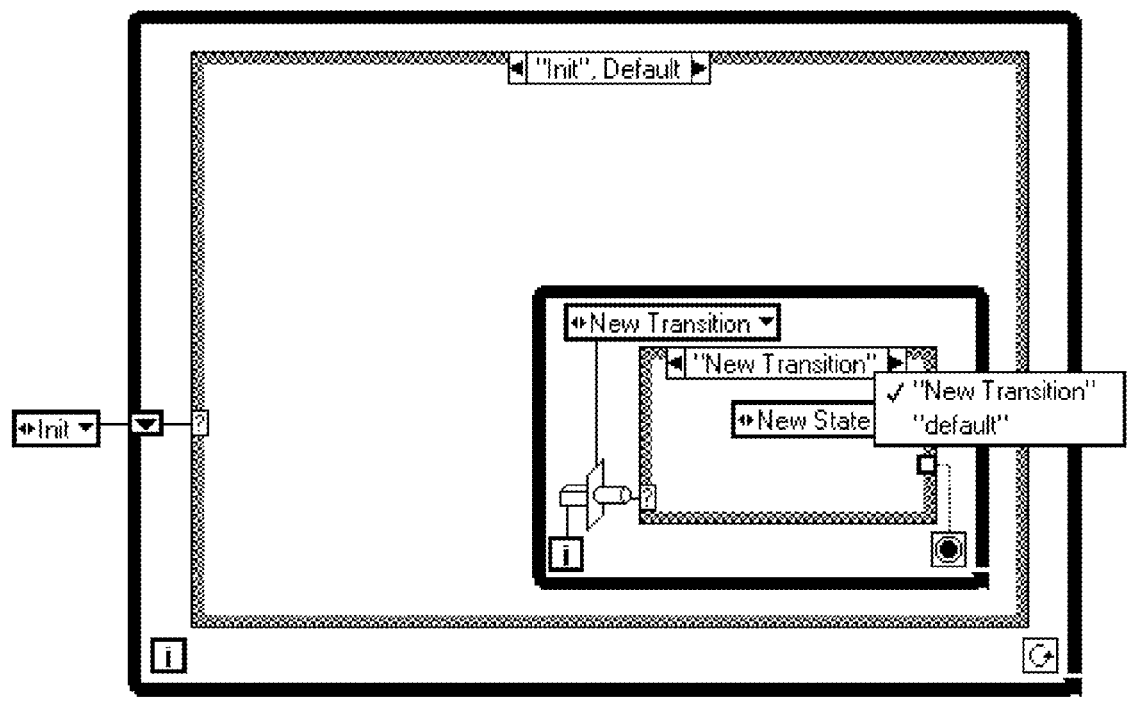

FIGS. 11-12: Adding a Transition

FIG. 11 illustrates a state diagram in which a transition has been added to the state diagram of FIG. 9, wherein the transition arrow goes from the "Init" state to the "New State" state. To effect this change in the graphical program, it is only necessary to programmatically change the code in the case structure 404 subdiagram corresponding to the state from which the transition originates, (the "Init" state in this case) as shown in FIG. 11. With respect to this subdiagram, it is sufficient to programmatically add a new entry to the transition enumeration 422, and then programmatically add a corresponding case subdiagram to the smaller case structure 424. Within this new case subdiagram, a constant specifying the destination state of the new transition ("New State" in this case) is wired for the output value 428 indicating the new active state, as shown in FIG. 11. As described above, the condition for the new transition is an arbitrary expression to be specified by the user; thus, no code for the new transition's condition is added to the graphical program, and the condition terminal 432 of the while loop 420 is left unwired.

If the state diagram editor supports the assignment of priority values to transitions, then the values of the transition enumeration 422 may be reassigned, if necessary, to reflect the desired priority order.

Figure 13:
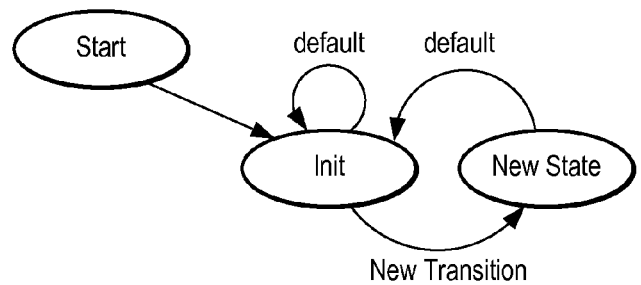
Figure 14:
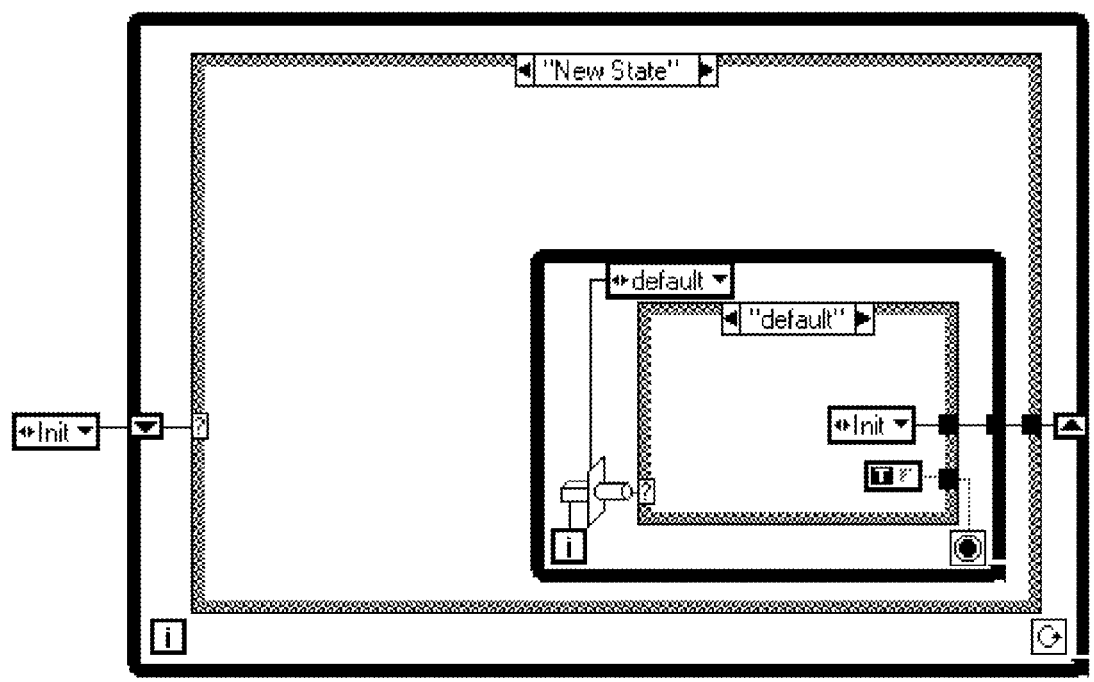

FIGS. 13-14: Changing the Destination State of an Existing Transition

FIG. 13 illustrates the state diagram of FIG. 11, in which the default transition for the "New State" state has been changed to point to the "Init" state. To effect this change in the graphical program, it is only necessary to programmatically change one constant value. This constant value is located in the case structure diagram corresponding to the transition that is changed. Thus, the constant value is located in the case structure 404 subdiagram corresponding to the state in which the transition originates, and within that subdiagram, it is further located within the subdiagram of the smaller case structure 424 that corresponds to the specific transition that was changed. FIG. 14 illustrates this change. FIG. 14 is identical to FIG. 10, except that the constant value 428 for the new active state has been programmatically changed to the "Init" enumerated type value instead of the "New State" enumerated type value. Thus, if the default transition from the "New State" state is followed, the new active state will now be the "Init" state, since the "Init" enumerated type value is now wired to the right terminal of the shift register 402.

Re-ordering the Priority of Transitions from a Given State

Similarly as noted above, to re-order the priority of transitions from a given state, it is sufficient to programmatically change values of the transition enumeration 422 in the case structure 424 subdiagram for the given state.

Renaming a State or Transition

To rename a state, it is sufficient to programmatically change the corresponding entry in each state enumeration constant on the LabVIEW diagram. To rename a transition, it is sufficient to programmatically change the corresponding entry in the transition enumeration constant that contains the transition.

Figure 15:
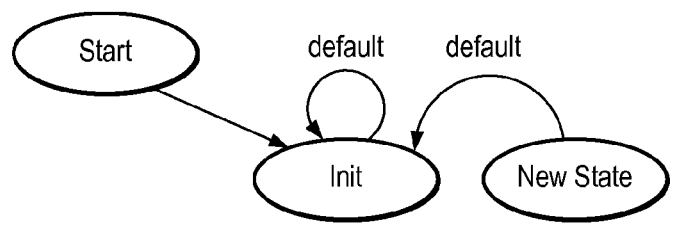
Figure 16:
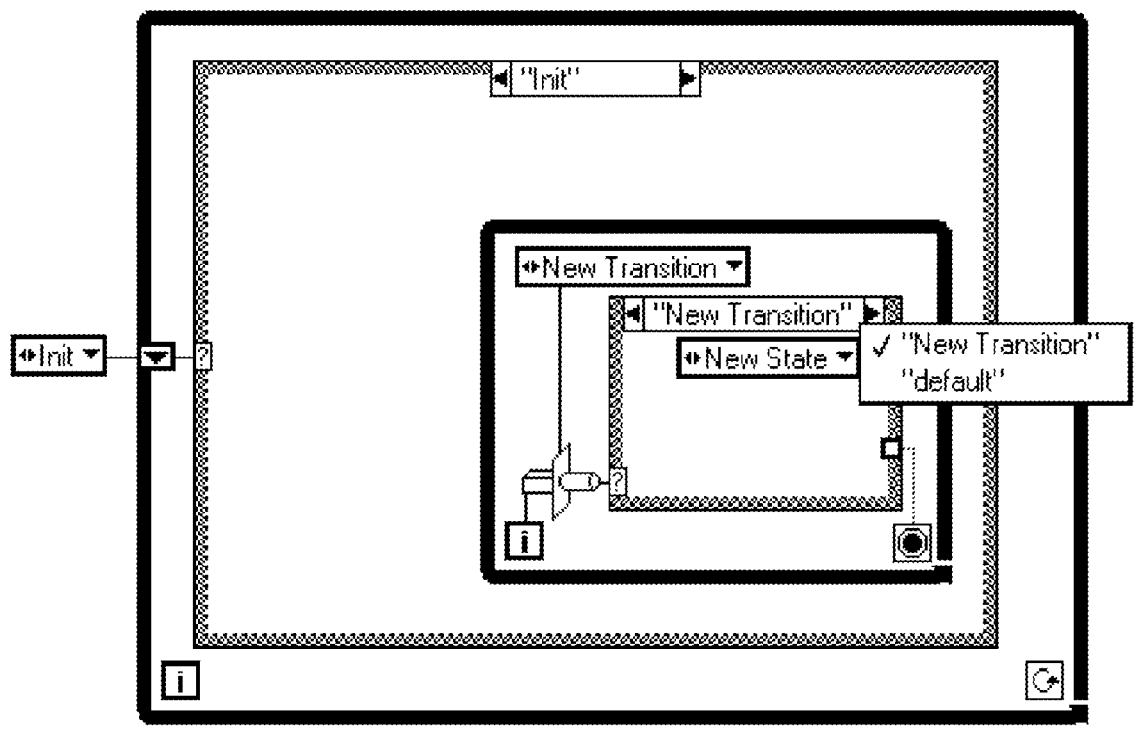
Figure 17:
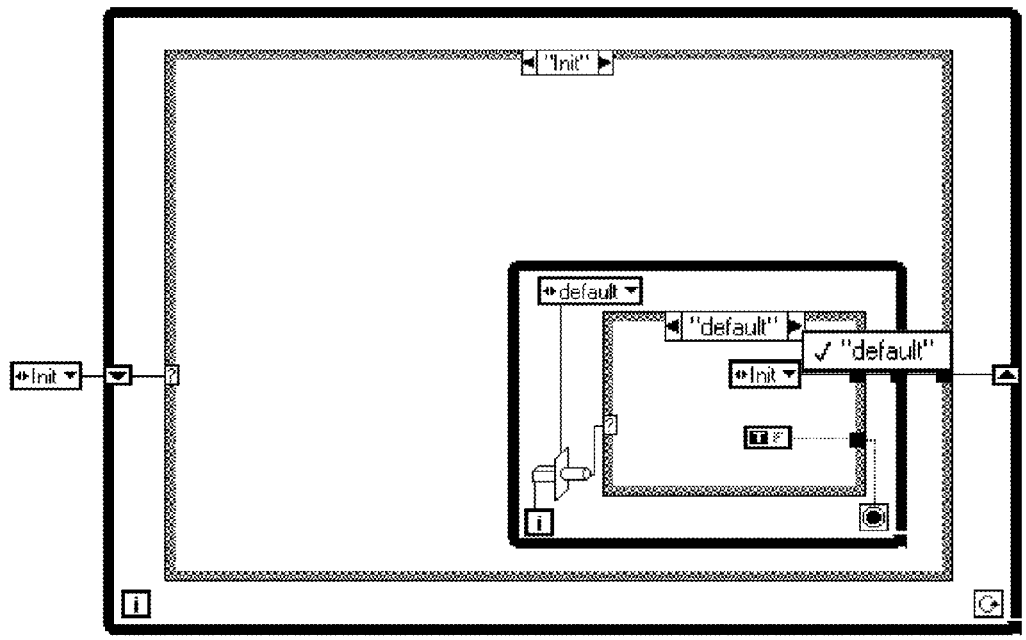

FIGS. 15-17: Deleting a Transition

FIG. 15 illustrates the state diagram of FIG. 13, in which the "New Transition" transition from the "Init" state to the "New State" state has been deleted. To effect this change in the graphical program, it is sufficient to programmatically delete the subdiagram corresponding to the deleted transition from the smaller case structure 424 within the subdiagram corresponding to the state from which the deleted transition originates. In one embodiment, deleting default transitions may not be allowed. The constant value corresponding to the deleted transition may also be programmatically removed from the transition enumeration 422. FIGS. 16 and 17 illustrate the graphical program before and after the "New Transition" transition has been programmatically deleted, respectively.

Deleting a State

To delete a state, first all transitions may be deleted whose destination is the state to be deleted and whose origin is not the state to be deleted. This may be done as described above. Any default transitions whose destination is the state to be deleted may be reverted to having their destination be the same as their state of origin. This may be performed in the same fashion as changing the destination state of an existing transition, as described above. Finally, it remains to programmatically remove the case subdiagram from the large case structure 404 that corresponds to the state to be deleted, and then to programmatically remove the state's name from the state enumeration constants which remain. When the state to be deleted is removed from the constant that initializes the left terminal of the shift register 402, this has the effect of changing the initial state to one of the remaining states. In one embodiment, a state may be deleted only if it is not the only state in the state diagram.

Figure 18:
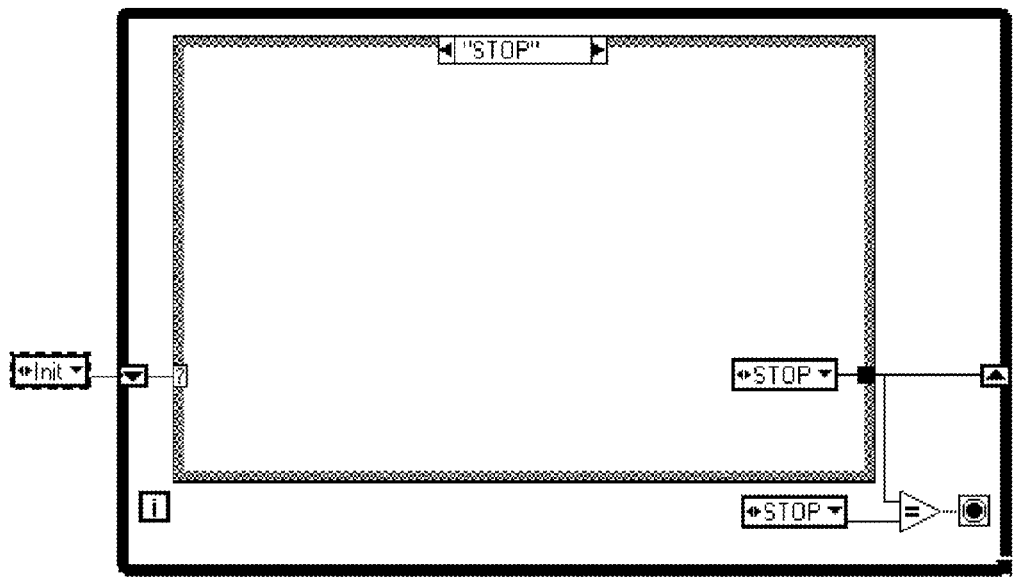

FIG. 18-Adding a "Stop" Marker

If there is no other "Stop" marker in the state diagram, the addition of a "Stop" marker is very similar to what happens when a new state is added. First, a "STOP" value is programmatically added to the state enumeration constants. Secondly, a new subdiagram is programmatically added to the large case structure 404 to accommodate the new "STOP" state. However, since there are no transitions out of this state, no inner while loop 420 or case structure 424 is needed. Finally, code is programmatically added to test whether or not the next active state is to be the "STOP" state, and if so, the outer while loop 400 is stopped, as shown in FIG. 18.

Adding a new "Stop" marker preferably has no effect if there is already another "Stop" marker in the state diagram.

Deleting a "Stop" Marker

Removal of any "Stop" marker from the state diagram results in the programmatically removal of any transitions whose destination is the marker to be deleted (see "Deleting a transition" above). However, unless the "Stop" marker is the only such marker on the transition diagram, no other code changes are made. If it is the last "Stop" marker, the diagram for the "STOP" state in the large case structure is programmatically removed, along with the code to stop the outer loop if the next active state is "STOP". In addition, the "STOP" state is programmatically removed from the state enumeration constants.

Changing the Destination State of the "Start" Marker Transition

Changing the destination state of the "Start" marker's transition simply results in programmatically changing the value of the state enumeration constant that initializes the left terminal of the shift register 402.

Locking the Graphical Program

As described above, in one embodiment, the programmatically generated graphical program may be "locked", requiring the user to explicitly unlock the graphical program before certain modifications to the graphical program can be made within the graphical programming environment. Locking the graphical program may ensure that the program's graphical source code is in a state known or expected by the GPG program, thus facilitating the dynamic update of the graphical program. For example, in one embodiment, the user may be allowed to add source code to the graphical program that specifies execution instructions for each state and Boolean conditions for each state transition, and may also be allowed to resize objects created by the GPG program.

However, the user may be prevented from modifying the topology of the framework programmatically generated by the graphical program until the graphical program is unlocked. For example, with respect to the specific examples given above, until the graphical program is unlocked the user may be prevented from removing the programmatically generated case structures, while loops, and wires that connect the state and transition constants to the case structures. The user may also be prevented from removing or renaming the state and transition constants.

FIG. 19—Example

Figure 19:
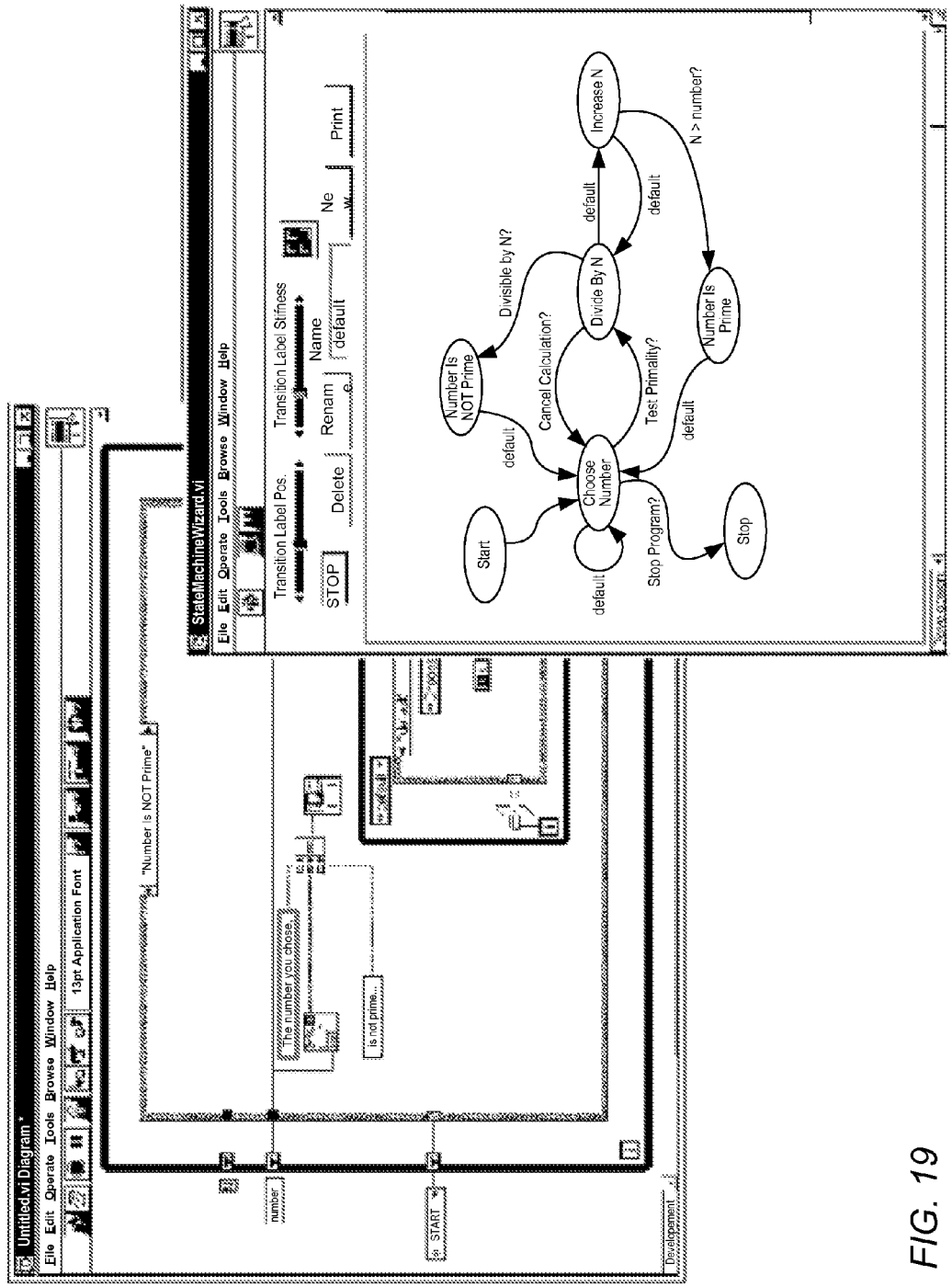
FIG. 19 illustrates an example in which a graphical program has been programmatically generated based on the state diagram of FIG. 1 and illustrates an exemplary graphical user interface of a state diagram editor.

FIG. 19 illustrates an example in which a graphical program has been programmatically generated based on the state diagram of FIG. 1. As described above, the GPG program may comprise, may be associated with, or may interface with a state diagram editor. FIG. 19 illustrates an exemplary graphical user interface of a state diagram editor, in which the state diagram of FIG. 1 is shown. FIG. 19 also illustrates a block diagram portion corresponding to the "Number is NOT Prime" state of the state diagram of FIG. 1. In this block diagram portion, the user has manually added graphical code to specify program instructions to execute when this state is active. In this case, the added code is operable to display a user interface message indicating that the chosen number is not prime.

As described above, in one embodiment the graphical program may be dynamically updated as the user develops the state diagram. Thus, the state diagram editor may in a sense be seen as an interactive program development tool. The state diagram editor may additional include functionality which aids the user in developing the desired graphical program, such as functionality providing further integration with the graphical programming development environment with which the graphical program is associated. For example, the state diagram editor may support execution highlighting, such that when the graphical program is executed, e.g., under control of the graphical programming development environment, the state oval corresponding to the currently active state of the graphical program is visually highlighted in the state diagram editor. The execution, control, and/or data flow of the graphical program may be highlighted in parallel in the block diagram window of the graphical programming development environment.

State Diagram Information Including States Which Specify Executable Code

In one embodiment of the invention, the state diagram information may include information specifying executable code or source code, referred to below as program code, associated with one or more states. For example, when the user is using a state diagram editor to create a state diagram, when the user places a state in the state diagram, in one embodiment the user may further specify program code for the state. This program code may then be used in the graphical program that is generated based on the state diagram. For example, the program code may specify execution instructions to be performed when the state is active and/or may specify transition condition execution instructions.

In various embodiments, the program code associated with a state may comprise any type of executable code or source code. For example, the program code may comprise a program module, such as a DLL or other shared library, Java class, etc. The program code may also include or may be based on any combination of text-based and/or graphical source code. If the program code is not graphical source code, then a "code interface" node may be included in the graphical program, wherein the code interface node is operable to call the non-graphical source code and link the non-graphical source code with the rest of the graphical program. If the program code is graphical source code, then the program code may be inserted into the block diagram of the generated graphical program. In one embodiment, the program code may comprise a graphical sub-program, which may appear in the block diagram as a single node. For example, in Lab-VIEW such a sub-program is referred to as a VI (Virtual Instrument).

In one embodiment, the state diagram editor may include or provide the user with access to one or more state graphical program portions or state "VIs". These state graphical code portions or state VIs may comprise states which inherently include a graphical code portion that is executed when the state is entered in the state diagram. In another embodiment, the user may place a state in the state diagram using the state diagram editor, and then may select program code to associate with the state. For example, the user may select an icon representing the program code from a palette and drag-and-drop the icon onto a state in the state diagram editor to associate the program code with the state, e.g., to specify that the program code executes when the state is entered in the graphical program. Thus, the user may use the state diagram editor to create a state diagram, and then may optionally associate program code with one or more of the states, e.g., by dragging and dropping icons onto the respective icons corresponding to the states, by selecting program code modules using a dialog box, etc.

When the GPG program operates to programmatically generate a graphical program, the GPG program may create a framework corresponding to the state diagram and may further create executable graphical code corresponding to the program code that is associated with the one or more states. Thus, in this embodiment the GPG program is operable to programmatically create a more complete graphical program than is otherwise possible if no program code was associated with any of the states in the state diagram. As one example, the user may associate program code with each of the states in the state diagram, and in this example the GPG program may be able to programmatically create a complete working graphical program based on the state diagram.

In one embodiment, when the user associates program code with a state in a state diagram, the GPG program may operate to analyze the various states to which the respective state is connected and may use this information in "connecting" the graphical code created corresponding to this program code with the graphical code corresponding to the other states or with the graphical code created based on the program code associated with the other connecting states. Thus, the GPG program may traverse the state diagram and utilize the connections to "tie in" or connect the graphical program portion corresponding to the program code of a respective state with its neighboring or connecting states. As one example of this operation, the program code associated with a state may be a graphical sub-program or VI having specified inputs and outputs, e.g., the outputs may comprise an array of Boolean values. Each Boolean value in this array may be associated with a transition condition for the state, and the Boolean values may determine the next state to be entered.

Figure 20:
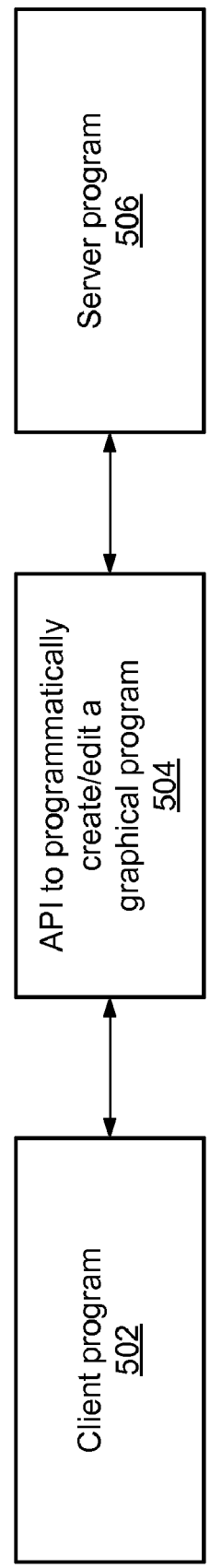
FIG. 20 is a block diagram illustrating the abstract relationship between a client program, an API to programmatically generate/edit a graphical program, and a server program, to describe an embodiment in which a graphical program generation (GPG) program is implemented as a client/server program.

FIG. 20—GPG Program Accesses Server Program Through an API

As described above, in one embodiment, the GPG program may be implemented as a client program and a server program, wherein the server program may provide an application programming interface (API) which the client program can use to programmatically generate the graphical program. One embodiment of such a client/server implementation of a GPG program is described below.

For each node, programmatic structure, user interface element, or other object of the graphical program, the client program may call the API to programmatically add the object to the graphical program, connect the object to other objects of the graphical program, etc. Any necessary files or other constructs needed by the graphical programming environment in order to use the generated graphical program may be automatically created by the server program as a result of calling the API.

FIG. 20 is a block diagram illustrating the abstract relationship between a client program 502, an API 504 to programmatically create/edit a graphical program, and a server program 506. It is noted that the API block represents the abstract notion of the API presented by the server program 506, and in various embodiments the API block 504 may not represent any actual code. Also, in actual embodiments, various layers may exist which implement the elements of the FIG. 20 relationship. For example, the client program 502 may be a part of a larger software application, the server program 506 may receive information sent by the client program 502 via an intermediate server, etc.

As noted above, the client program 502 may be any of various types of programs. For example, the client program 502 may be a graphical program. The client program 502 may also be a text-based program such as a C++ program, a Visual Basic program, a Java program, etc., or any combination of these or other languages. The client program 502 may execute independently or may execute within an execution subsystem of an application development environment.

The client program 502 may call the API 504 in any of various ways. For example, a client graphical program may include graphical nodes corresponding to the API 504. A client graphical program may also interface with text-based code which calls the API 504. The client program 502 may also call the API 504 in various other ways. For example, the server program 506 may expose a component such as an ActiveX component, CORBA component, JavaBeans component, etc., and the client program 502 may obtain a reference to the object to invoke functions or methods of the API 504. The API 504 may also be integrated with the language or development environment of the client program 502, e.g. as a library.

Through the API 504, the client program 502 may communicate with the server program 506. The server program 506 is operable to perform the actions indicated by the API calls. For example, the server program may be operable to create a new graphical program, add objects to the graphical program, connect graphical program objects, etc. The server program 506 is preferably an instance of a graphical programming environment. In one embodiment, the server program 506 is an instance of the LabVIEW graphical programming environment.

As noted above, the GPG program may also be considered to be only the client program 502, wherein in this instance the GPG program 502 simply uses the services of a separate server program.

Graphical API

The server program 506 of FIG. 20 may be operable to receive requests to generate/edit a graphical program from a client program 502 and perform the actual operations of creating/editing the graphical program. Thus, in the preferred embodiment, the client program 502 includes program logic for processing received state diagram information and determining the structure of a graphical program to be generated based on the received state information, and the client program calls the server program to perform the generation of the graphical program (or to perform a modification to an existing graphical program).

In one embodiment, the server program 506 of FIG. 20 is an application instance of the LabVIEW graphical programming development environment. The LabVIEW environment provides specialized support for developers of instrumentation and industrial automation applications, and a LabVIEW graphical program may be referred to as a virtual instrument or VI. The LabVIEW environment comprises functionality referred to as "VI Server" which enables client programs to communicate with the LabVIEW environment. The VI Server functionality enables client programs to create or edit a LabVIEW graphical program or VI.

A client program which requests LabVIEW to generate/edit a VI may itself be a graphical program or VI. A client VI may include particular nodes in the client VI block diagram which utilize the VI Server functionality of a LabVIEW instance to request the LabVIEW instance to obtain information of an existing VI, create a new VI, add objects to the VI, etc. These nodes and exemplary uses of the nodes are described in U.S. patent application Ser. No. 09/745,023, titled "System and Method for Programmatically Generating a Graphical Program in Response to Program Information", which was incorporated by reference above. (LabVIEW also provides components such as ActiveX components which enable text-based programs such as Visual Basic programs, Visual C++ programs, etc. to access the VI Server functionality. In the preferred embodiment, these components enable text-based client programs to perform all of the VI server functions that graphical client programs can perform.)

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A memory medium comprising program instructions executable by a processor to:
receive a first diagram, wherein the first diagram specifies one or more states and one or more transitions between the states, wherein the first diagram specifies a first functionality;
automatically generate a data flow diagram based on the first diagram, wherein the data flow diagram comprises a plurality of nodes and connections between the nodes, wherein at least a subset of the connections indicates that data produced by one node is used by another node, wherein the plurality of nodes comprises at least a first node that represents control flow of data among one or more of the plurality of nodes, and wherein the data flow diagram specifies the first functionality; and
store the data flow diagram in a memory;
wherein the data flow diagram is executable by the processor to perform the first functionality.

2. The memory medium of claim 1, wherein the first node specifies iteration for the one or more nodes.

3. The memory medium of claim 1, wherein the first node indicates iteration of the one or more nodes;
wherein the iteration node is associated with an iteration number which indicates a number of iterations for the one or more nodes, and wherein said generating uses the iteration number in generating the hardware description.

4. The memory medium of claim 1, wherein the first node specifies iteration for the one or more nodes, wherein the first node is operable to receive an iterator number, wherein the iterator number specifies a number of iterations for the one or more nodes.

5. The memory medium of claim 1, wherein the first node specifies looping for the one or more nodes.

6. The memory medium of claim 1, wherein the first node specifies conditional branching for the one or more nodes.

7. The memory medium of claim 1, wherein the first node comprises an interior portion, wherein nodes comprised in the interior portion of the first node execute according to control flow as specified by the first node.

8. The memory medium of claim 1, wherein the first node is one of an iteration node or a looping node;
wherein the first node comprises at least one of a period parameter and a phase delay parameter, wherein the period parameter indicates a period of execution for cycles of the one or more nodes, and wherein the phase delay parameter indicates a phase delay of cycles of the one or more nodes.

9. The memory medium of claim 1, wherein the first node comprises one or more of:
a while/do loop;
a for/next loop;
a case structure node; or
a sequence structure node.

10. The memory medium of claim 1, wherein the program instructions are further executable to:
display the data flow diagram on a display after said automatically generating the data flow diagram.

11. The memory medium of claim 1, wherein the first diagram is a state diagram.

12. The memory medium of claim 1, wherein, for at least one state of the one or more states, the first diagram comprises program code associated with the at least one state;
wherein the data flow diagram comprises the specified program code.

13. The memory medium of claim 1, wherein, for at least one state, the first diagram comprises program code associated with the state;
wherein the data flow diagram is operable to invoke the specified program code.

14. The memory medium of claim 1, wherein the data flow diagram comprises at least one placeholder for at least one state transition of the one or more transitions.

15. The memory medium of claim 1, wherein the first diagram specifies at least two state transitions from a particular state;
wherein the first diagram also specifies a priority ordering for the at least two state transitions;
wherein said automatically generating comprises automatically generating the data flow diagram such that, during execution of the data flow diagram, conditions associated with the at least two state transitions are evaluated according to the specified priority ordering.

16. The memory medium of claim 1, wherein the first diagram further specifies an initially active state, and wherein said automatically generating comprises automatically generating the data flow diagram such that the data flow diagram begins execution in the initially active state.

17. The memory medium of claim 1, wherein the first diagram further specifies one or more stop states, and wherein said automatically generating comprises automatically generating the data flow diagram such that if during execution of the data flow diagram one of the stop states becomes active, then the data flow diagram is caused to stop execution.

18. The memory medium of claim 1, wherein the program instructions are further executable to:
   receive information specifying a change to the first diagram;
   automatically update the data flow diagram to reflect the specified change.

19. A method, comprising:
   receiving a first diagram, wherein the first diagram specifies one or more states and one or more transitions between the states, wherein the first diagram specifies a first functionality;
   automatically generating a data flow diagram based on the first diagram, wherein the data flow diagram comprises a plurality of nodes and connections between the nodes, wherein at least a subset of the connections indicates that data produced by one node is used by another node, wherein the plurality of nodes comprises at least a first node that represents control flow of data among one or more of the plurality of nodes, and wherein the data flow diagram specifies the first functionality; and
   storing the data flow diagram in a memory;
   wherein the data flow diagram is executable by a processor to perform the first functionality.

20. A system, comprising:
   a processor;
   a memory medium coupled to the processor, wherein the memory medium comprises program instructions executable by the processor to:
      receive a first diagram, wherein the first diagram specifies one or more states and one or more transitions between the states, wherein the first diagram specifies a first functionality;
      automatically generate a data flow diagram based on the first diagram, wherein the data flow diagram comprises a plurality of nodes and connections between the nodes, wherein at least a subset of the connections indicates that data produced by one node is used by another node, wherein the plurality of nodes comprises at least a first node that represents control flow of data among one or more of the plurality of nodes, and wherein the data flow diagram specifies the first functionality; and
      store the data flow diagram in a memory;
   wherein the data flow diagram is executable by the processor to perform the first functionality.

* * * * *